US012164260B2

(12) United States Patent
Yada et al.

(10) Patent No.: US 12,164,260 B2
(45) Date of Patent: Dec. 10, 2024

(54) PROCESS CARTRIDGE HAVING A RECEPTACLE FOR DEVELOPER REPLENISHMENT

(71) Applicant: CANON KABUSHIKI KAISHA, Tokyo (JP)

(72) Inventors: Takayuki Yada, Shizuoka (JP); Naoki Maeda, Shizuoka (JP); Yuuki Nakamura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/210,152

(22) Filed: Jun. 15, 2023

(65) Prior Publication Data

US 2023/0418215 A1 Dec. 28, 2023

(30) Foreign Application Priority Data

Jun. 24, 2022 (JP) ................................ 2022-102165

(51) Int. Cl.
*G03G 21/18* (2006.01)

(52) U.S. Cl.
CPC ................................ *G03G 21/1814* (2013.01)

(58) Field of Classification Search
USPC ........................................................ 399/119
See application file for complete search history.

(56) References Cited

U.S. PATENT DOCUMENTS

| | | | |
|---|---|---|---|
| 7,158,730 B2 * | 1/2007 | Watanabe .......... | G03G 15/0896 399/119 |
| 8,036,543 B2 | 10/2011 | Yokomori et al. | |
| 8,180,251 B2 | 5/2012 | Nakamura et al. | |
| 8,275,283 B2 | 9/2012 | Uneme et al. | |
| 8,326,178 B2 | 12/2012 | Nakamura et al. | |
| 8,401,441 B2 | 3/2013 | Uneme et al. | |
| 8,687,994 B2 | 4/2014 | Nakamura et al. | |
| 8,913,920 B2 | 12/2014 | Nakamura et al. | |
| 9,128,417 B2 | 9/2015 | Yamasaki et al. | |
| 9,164,424 B2 | 10/2015 | Nakamura et al. | |

(Continued)

FOREIGN PATENT DOCUMENTS

| | | |
|---|---|---|
| JP | 2012-058609 A | 3/2012 |
| JP | 2018-159726 A | 10/2018 |
| JP | 2021-063970 A | 4/2021 |

OTHER PUBLICATIONS

Co-pending U.S. Appl. No. 18/204,420, filed Jun. 1, 2023.

(Continued)

*Primary Examiner* — Quana Grainger
(74) *Attorney, Agent, or Firm* — Venable LLP

(57) ABSTRACT

A cartridge is used, which has a receptacle with a replenishment port from which a developer is replenished and which is configured to receive the developer replenished from the replenishment port. The receptacle has a transport region that is located lower than the replenishment port in the direction of gravity, where the received developer is transported in a transport direction. The receptacle is provided with a first filter and a second filter downstream and upstream of the replenishment port respectively in the transport direction. The first filter and second filter restrict passage of the developer while allowing passage of air. The first filter or the second filter is located higher than the transport region in the direction of gravity.

10 Claims, 31 Drawing Sheets

(56) References Cited

U.S. PATENT DOCUMENTS

| | | | | |
|---|---|---|---|---|
| 9,304,483 | B2 | 4/2016 | Komatsu et al. | |
| 9,377,716 | B2 | 6/2016 | Yamasaki et al. | |
| 9,442,457 | B2 | 9/2016 | Maeda et al. | |
| 9,535,398 | B2 | 1/2017 | Yada et al. | |
| 9,684,279 | B2 | 6/2017 | Nakamura et al. | |
| 10,268,156 | B2 | 4/2019 | Takeuchi et al. | |
| 10,324,413 | B2 | 7/2019 | Nakamura et al. | |
| 10,579,012 | B2 | 3/2020 | Takeuchi et al. | |
| 10,935,926 | B2 | 3/2021 | Takeuchi et al. | |
| 10,969,730 | B2 | 4/2021 | Sueshige et al. | |
| 10,983,475 | B2 | 4/2021 | Sueshige et al. | |
| 11,378,909 | B2 | 7/2022 | Sueshige et al. | |
| 11,586,140 | B2 | 2/2023 | Maeda | |
| 2010/0129118 | A1* | 5/2010 | Kimura .............. | G03G 15/0886 399/260 |
| 2018/0129150 | A1* | 5/2018 | Taniguchi .......... | G03G 15/0891 |
| 2022/0283535 | A1 | 9/2022 | Sueshige et al. | |

OTHER PUBLICATIONS

Co-pending U.S. Appl. No. 18/208,405, filed Jun. 12, 2023.
Co-pending U.S. Appl. No. 18/212,241, filed Jun. 21, 2023.
Co-pending U.S. Appl. No. 18/213,383, filed Jun. 23, 2023.

* cited by examiner

PROCESS CARTRIDGE HAVING A RECEPTACLE FOR DEVELOPER REPLENISHMENT

BACKGROUND OF THE INVENTION

Field of the Invention

The present invention relates to a process cartridge and an image forming apparatus.

Description of the Related Art

Image forming apparatuses that use electrophotographic image forming techniques to form images on recording media have been known. Electrophotographic copiers, electrophotographic printers (e.g., LED printers, laser beam printers, etc.), facsimiles, and word processors are examples of such apparatuses.

Electrophotographic image forming apparatuses that use removable cartridges are also known. A cartridge includes at least one of a developer, a photosensitive drum, and processing means that perform a process on the photosensitive drum, for example, and is removably mounted to the main body of an image forming apparatus (hereinafter referred to as "apparatus body"). A process cartridge is a typical example of the cartridges. The process cartridge is a cartridge, in which an image bearing member and processing means that act on the image bearing member are combined and allowed to be removably mounted to the apparatus body. Other examples include developer cartridges that contain developing means, and toner cartridges that hold replenishment toner.

Japanese Patent Application Publication No. 2021-063970 describes a configuration for replenishing toner from a toner pack to a toner container provided to a frame body of a process cartridge that is removably mounted to an image forming apparatus.

The frame body of the process cartridge in Japanese Patent Application Publication No. 2021-063970 is formed with a replenishment port that communicates with the toner container, and a first opening and a second opening that make the toner container communicate with the outside of the frame body. Filters that allow passage of air and restrict passage of the toner are attached so as to cover the first opening and second opening. This way, the air entering together with the toner during replenishment can flow through.

Japanese Patent Application Publication No. 2021-063970 describes a transport member disposed in the toner container and configured to transport the toner in a direction away from the replenishment port. The first opening is provided on the opposite side to the replenishment port, with the center of the toner container therebetween, in the direction of the rotation axis of the transport member. The second opening is provided between the center of the toner container and the replenishment port in the direction of the rotation axis.

SUMMARY OF THE INVENTION

An object of the present invention is to prevent toner replenishment failures in an image forming apparatus equipped with a configuration for replenishing toner to a process cartridge.

The present invention provides a process cartridge comprising:

a receptacle provided with a replenishment port from which a developer is replenished, and configured to receive the developer replenished from the replenishment port; and a transport member disposed lower than the replenishment port in a direction of gravity in the receptacle and configured to transport the developer in a transport direction, the receptacle being provided with a first filter disposed on a first opening located downstream of the replenishment port in the transport direction, and a second filter disposed on a second opening located upstream of the replenishment port in the transport direction, the first filter and the second filter being configured to restrict passage of the developer while allowing passage of air, the first filter or the second filter being located higher than the transport member in the direction of gravity.

The present invention also provides a process cartridge comprising:

a receptacle provided with a replenishment port from which a developer is replenished, and configured to receive the developer replenished from the replenishment port;

a container configured to contain the developer; and a container inlet configured to allow the developer to travel from the receptacle to the container, the container inlet being provided in a bottom surface of the receptacle, the bottom surface having a slope, the receptacle being provided with: a first filter disposed on a first opening located downstream of the replenishment port, the downstream being a lower side in a direction of gravity of the slope; and a second filter disposed on a second opening located upstream of the replenishment port, the upstream being an upper side in the direction of gravity of the slope, and the first filter and the second filter being configured to restrict passage of the developer while allowing passage of air, the first filter or the second filter being located higher than the receptacle in the direction of gravity.

The present invention also provides a process cartridge comprising:

a replenishment port from which a developer is replenished and which is connected to a developer cartridge;

a receptacle configured to receive the developer replenished from the replenishment port;

an image bearing member; and a developer carrying member configured to supply the developer to the image bearing member, the developer being replenished from the developer cartridge to the replenishment port in a direction along a longitudinal direction of the developer carrying member.

The present invention also provides an image forming apparatus comprising:

a process cartridge having a longitudinal direction; and a developer cartridge that replenishes a developer to the process cartridge, the process cartridge including a replenishment port from which the developer is replenished, and a receptacle configured to receive the developer replenished from the replenishment port, the developer cartridge including an outlet configured to discharge the developer and being connectable to the replenishment port, the developer being replenished from the developer cartridge to the replenishment port in a direction along the longitudinal direction.

According to the present invention, toner replenishment failures can be prevented in an image forming apparatus equipped with a configuration for replenishing toner to a process cartridge.

Further features of the present invention will become apparent from the following description of exemplary embodiments with reference to the attached drawings.

DESCRIPTION OF THE EMBODIMENTS

Embodiment 1

Figure 2:
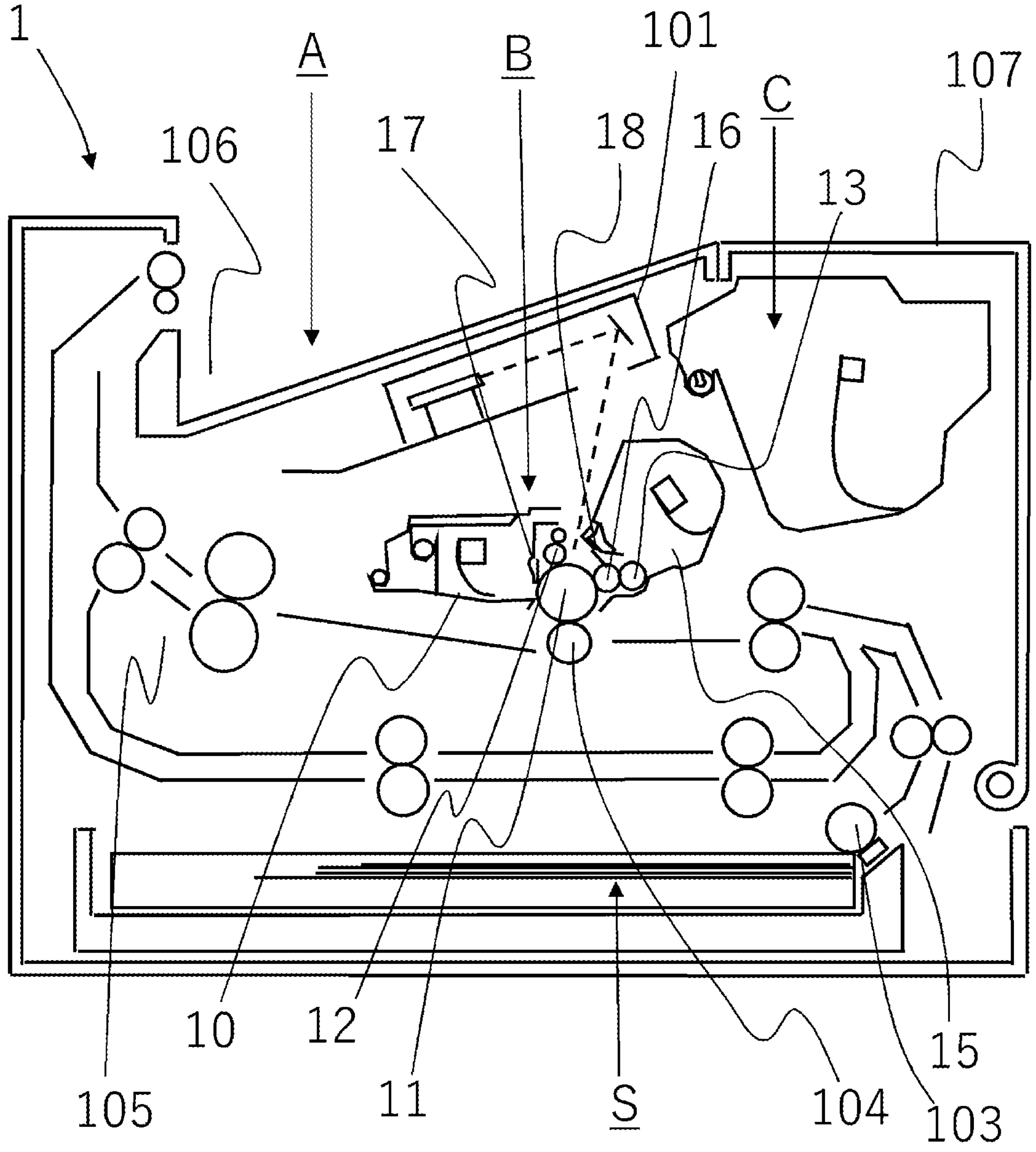
FIG. 2 is a cross-sectional view illustrating a schematic configuration of a laser printer.

FIG. 2 is a cross-sectional view illustrating a schematic configuration of a laser printer that is one example of an image forming apparatus. It should be noted that the sizes, materials, shapes, and relative arrangement or the like of constituent components described in the following embodiments should be altered suitably in accordance with the configuration and various conditions of an apparatus to which the present invention is applied. Accordingly, unless otherwise particularly specified, these specific features are not intended to limit the scope of the present invention to the following embodiments.

As described below and illustrated in the drawings, the process cartridge B includes a photosensitive drum unit 11 (image bearing member), a cleaning blade 17, a charging roller 12, and a developing roller 16 (developer carrying member). These components and the toner cartridge C all have a shape extending along one direction. This direction in which these components extend shall be referred to as longitudinal direction or horizontal direction.

General Description of Entire Laser Printer

As shown in FIG. 2, the laser printer 1 is composed of a printer body A (main body of the image forming apparatus), the process cartridge B, and the toner cartridge C (developer cartridge). The printer body A is equipped with a sheet feeder part 103, a transfer roller 104, a fixing unit 105, and a laser scanner 101. The process cartridge B and toner cartridge C are disposed in the printer body A in a removable manner.

Figure 3:
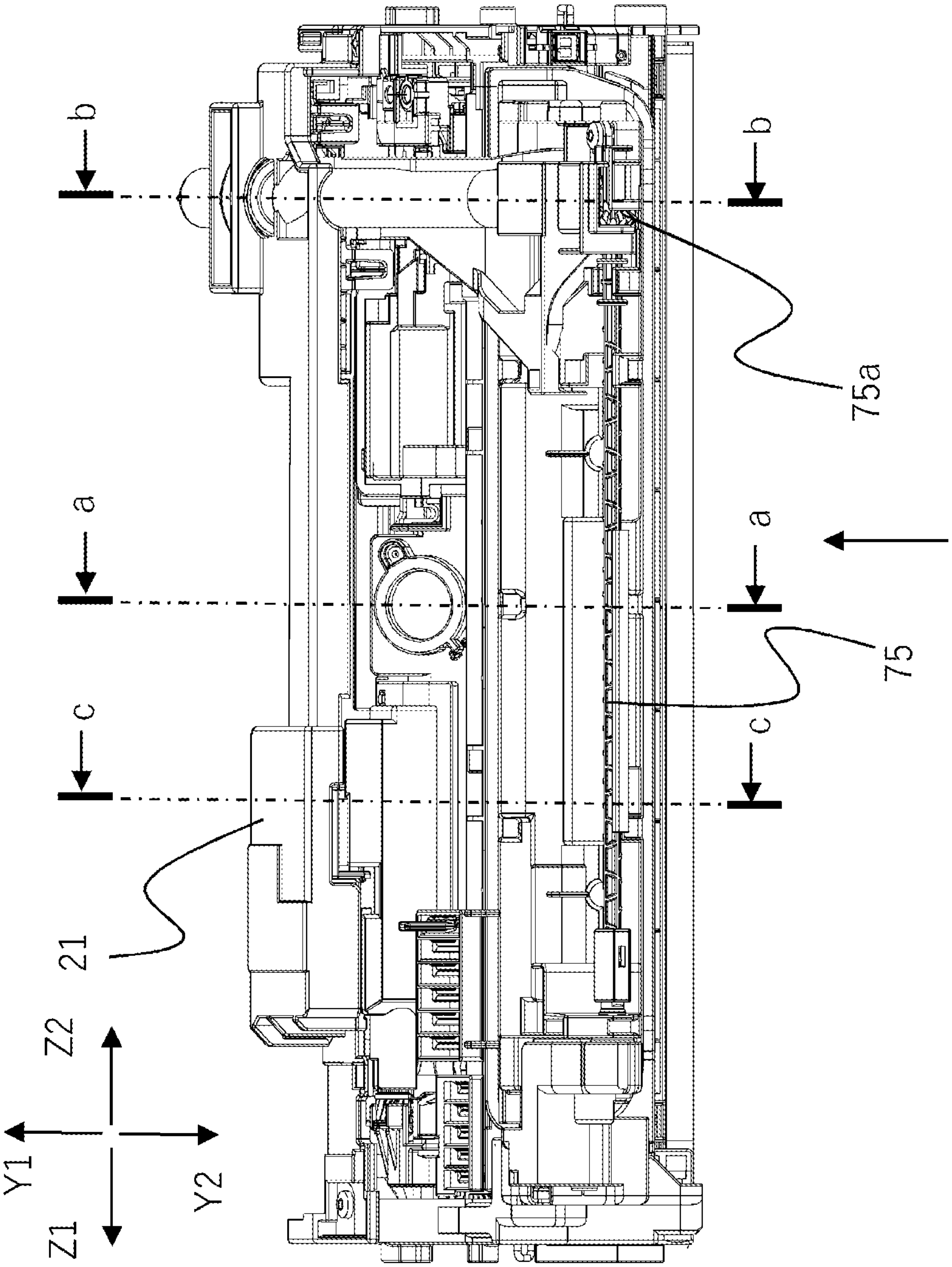
FIG. 3 is a schematic front view illustrating the process cartridge.
Figure 4:
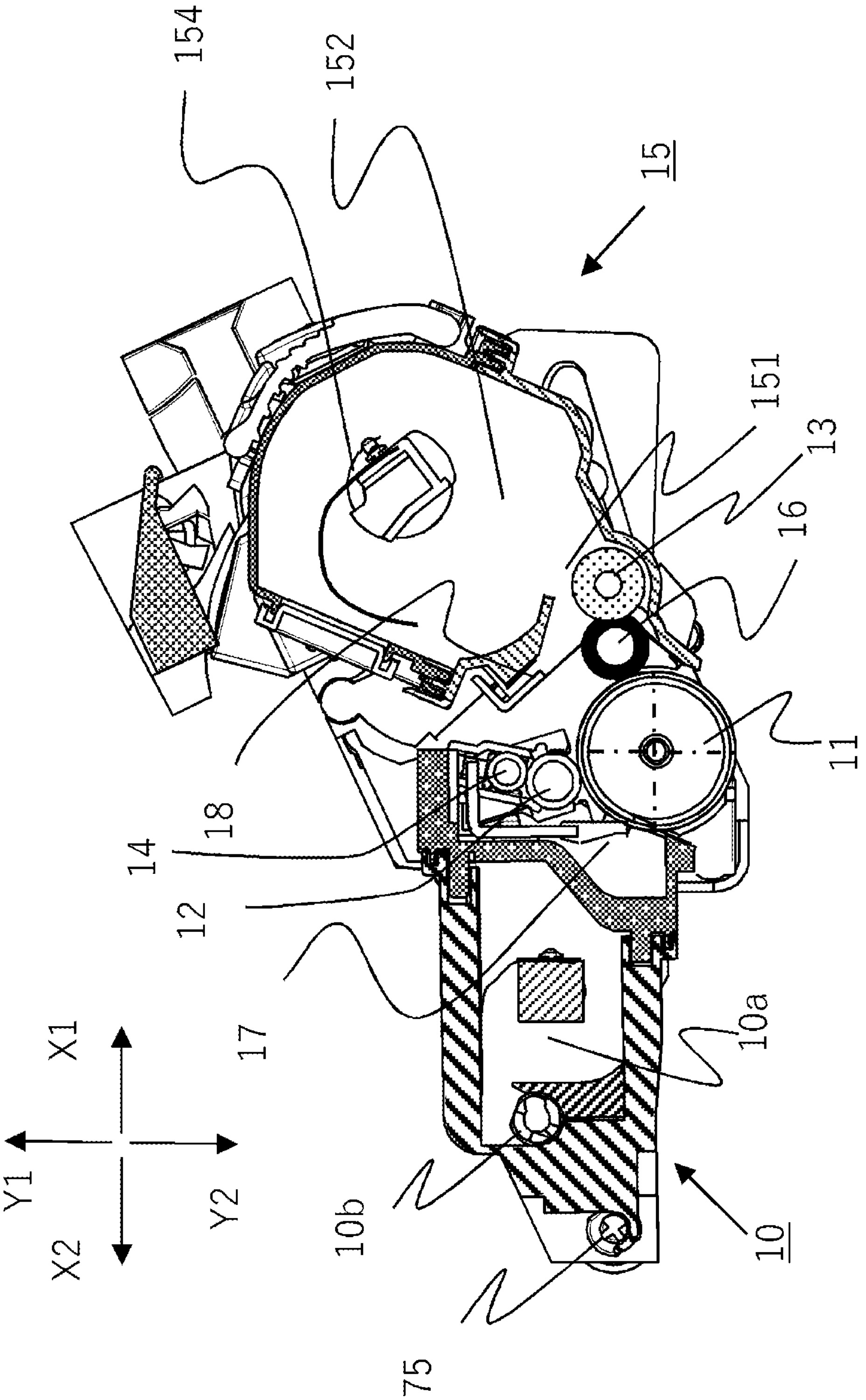
FIG. 4 is a cross-sectional view illustrating a schematic configuration of the process cartridge.
Figure 5:
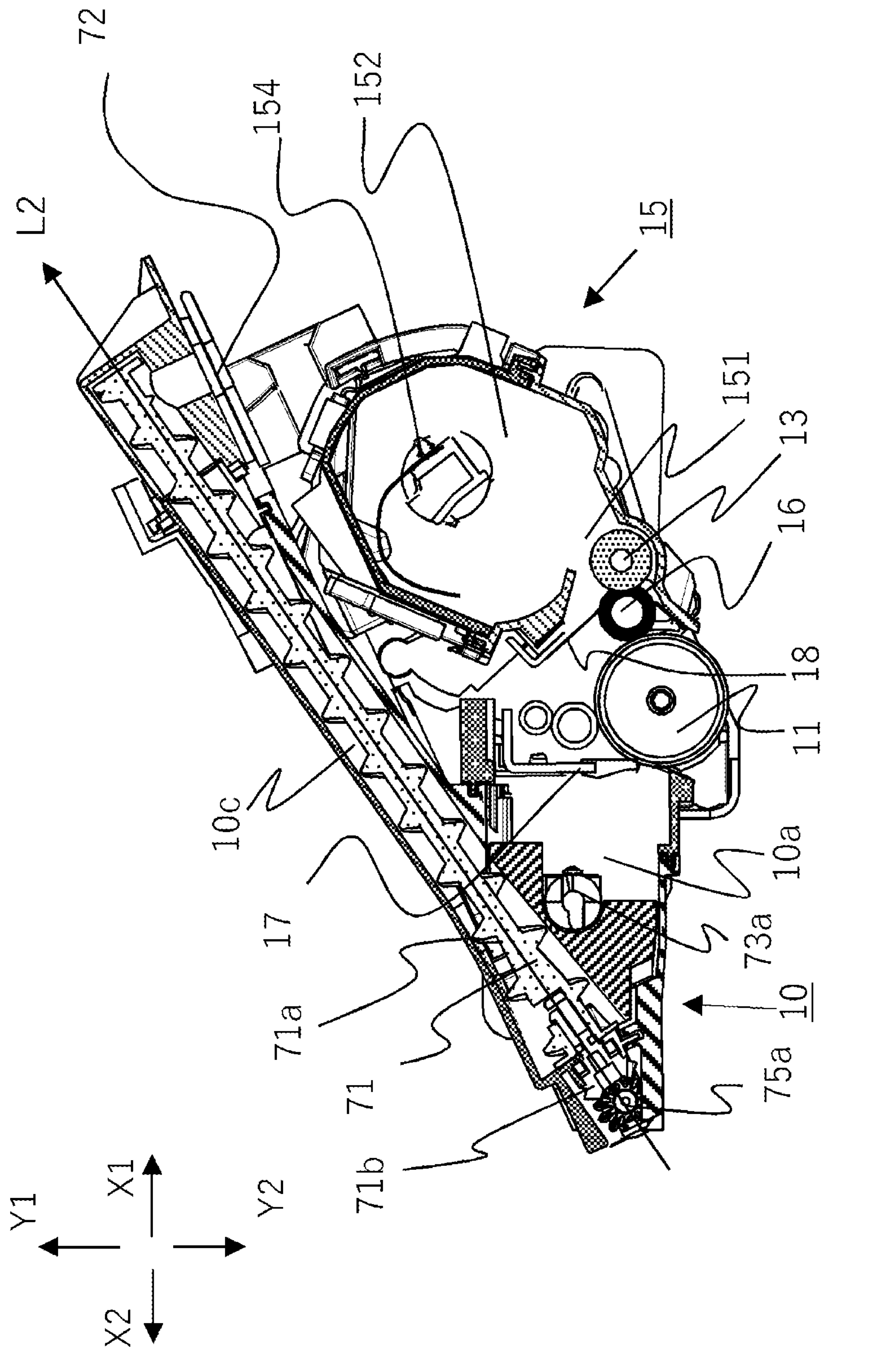
FIG. 5 is a cross-sectional view illustrating a second waste toner transport path of the process cartridge.
Figure 6:
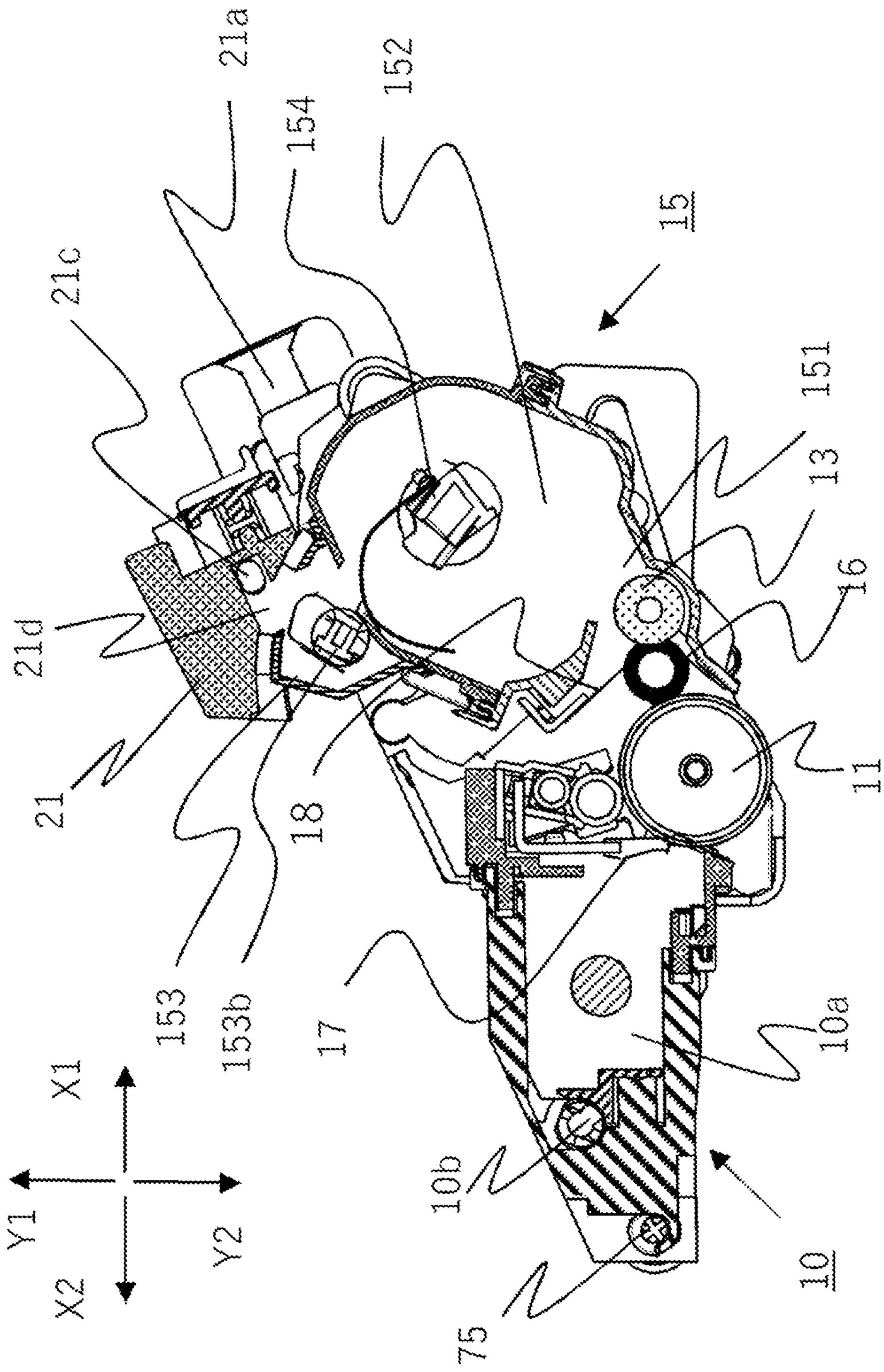
FIG. 6 is a cross-sectional view illustrating a replenishment port of the process cartridge.

The process cartridge B is described with reference to FIG. 3, FIG. 4, FIG. 5, and FIG. 6. FIG. 3 is a schematic front view illustrating the process cartridge B. FIG. 4 is a cross-sectional view (a cross section along a-a of FIG. 3) illustrating the schematic configuration of the process cartridge B. FIG. 5 is a cross-sectional view (a cross section along b-b of FIG. 3) illustrating a second waste toner transport path 10*c* of the process cartridge B. FIG. 6 is a cross-sectional view (a cross section along c-c of FIG. 3) illustrating a replenishment port of the process cartridge B.

As shown in FIG. 3, FIG. 4, and FIG. 5, the process cartridge is composed of a cleaning unit 10 (first unit) that includes the photosensitive drum unit 11 as a photosensitive drum, and a development unit 15 (second unit) that includes the developing roller 16 as a developing means that carries a developer (toner).

The cleaning unit 10 includes the photosensitive drum unit 11 mentioned above, the cleaning blade 17 provided as a cleaning member for the photosensitive drum unit 11, the charging roller 12 as a charging member, a charging roller cleaner 14 as a cleaning member for the charging roller 12, a primary waste toner container 10*a*, and a first waste toner transport path 10*b*.

The charging roller 12 is disposed such as to make contact with an outer circumferential surface of the photosensitive drum unit 11 to charge the photosensitive drum unit 11 by voltage application from the printer body A. When the photosensitive drum unit 11 rotates, the charging roller 12 is rotated therewith.

The cleaning blade 17 is an elastic member disposed in contact with an outer circumferential surface of the photosensitive drum unit 11. The cleaning blade 17, with its tip elastically making contact with the photosensitive drum unit 11, removes residual toner remaining after a sheet S has passed through between the photosensitive drum unit 11 and the transfer roller 104 as will be described later, from the photosensitive drum unit 11. The removed toner (waste toner) is transported from the primary waste toner container 10*a* to be described later to the toner cartridge C via the first waste toner transport path 10*b* and second waste toner transport path 10*c*.

As shown in FIG. 6, the development unit 15 includes a development chamber 151 where the developing roller 16 is disposed, a developer container 152 that supplies toner to the development chamber 151, and a toner receptacle 153 that receives the toner supplied from the toner cartridge C.

The developing roller 16 supplies toner to an area on the photosensitive drum unit 11 where development takes place. The developing roller 16, using the toner, develops the latent image formed on the photosensitive drum unit 11. A supply roller 13 supplies toner to the developing roller 16.

A developing blade 18 makes contact with a circumferential surface of the developing roller 16 and controls the amount of toner adhered on the circumferential surface of the developing roller 16. The developing blade also triboelectrifies the toner.

The toner contained in the developer container 152 is fed out into the development chamber 151 by rotation of a stirrer 154 and supplied to the developing roller 16.

A sensing means (not shown) detects the remaining amount of toner inside the developer container 152, and when the toner amount inside the developer container 152 falls below a preset level, the toner cartridge C supplies toner to the process cartridge B. The toner is delivered to the development unit 15 via a replenishment port 21*c* and a delivery port 21*d* of a stay 21 and supplied to the developer container 152 via the toner receptacle 153.

As will be described in detail later, the process cartridge B and toner cartridge C are removably mounted to the printer body A.

Next, the operation of the laser printer 1 is described with reference to FIG. 2.

The charging roller 12 creates a uniform charge of a preset potential on the photosensitive drum unit 11 that is rotated by a drive power source (not shown). The laser scanner 101 then performs exposure to the charged surface of the photosensitive drum unit 11 based on image information so that the charge is removed in exposed areas and an electrostatic latent image is formed. The developing roller 16 supplies toner on the photosensitive drum unit 11 to make the electrostatic latent image visible as a toner image.

Meanwhile, in parallel with this operation of forming a toner image, a sheet S is transported along a path by the sheet feeder part 103. Namely, a feeder roller 103*b* rotates and moves forward the sheet S. The sheet S is then transported to between the photosensitive drum unit 11 and the transfer roller 104 in sync with the toner image formation on the photosensitive drum unit 11. The toner image is transferred onto the sheet S as an unfixed image by application of a bias voltage to the transfer roller 104 as the sheet passes through. The sheet S carrying the transferred toner image is then transported to the fixing unit 105. Heat and pressure are applied to the sheet S that has arrived at the fixing unit 105 as the sheet S passes through so that the unfixed image is fixed on the surface of the sheet S. The sheet is further transported by the sheet feeder part 103 to be expelled and stacked onto a discharge tray 106.

General Description of Process Cartridge B

The configuration of the process cartridge B in this embodiment is described in more detail with reference to FIG. 4, FIG. 10A, FIG. 10B, FIG. 11A, and FIG. 11B. FIG. and FIG. 10B are exploded perspective views of the process cartridge B. FIG. 11A and FIG. 11B are schematic side views illustrating how the development unit 15 makes contact with and separates from the photosensitive drum unit 11 in the process cartridge B.

Figure 10A:
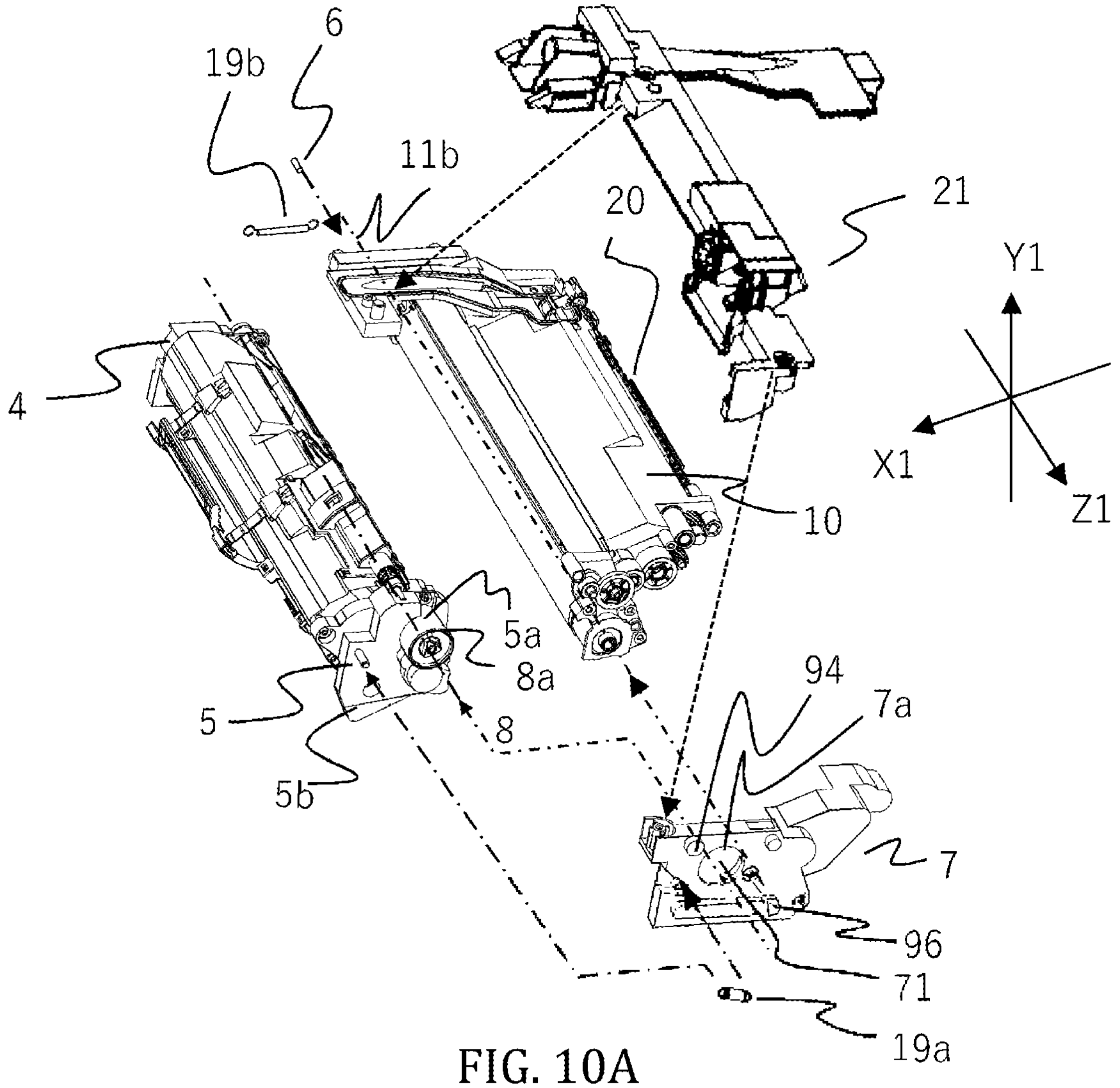
FIG. 10A is an exploded perspective view of the process cartridge.
Figure 10B:
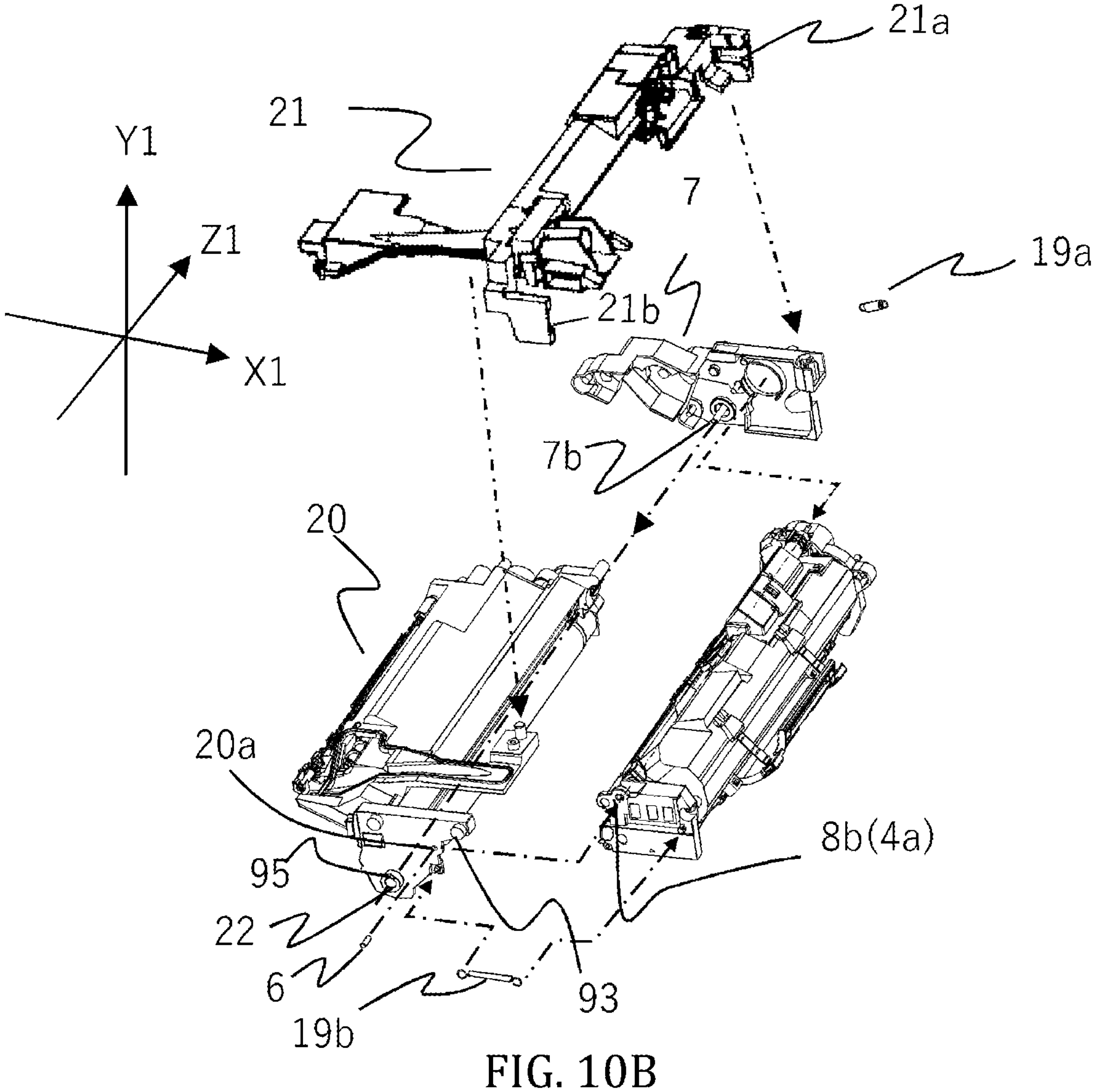
FIG. 10B is an exploded perspective view of the process cartridge from a different angle.
Figure 11A:
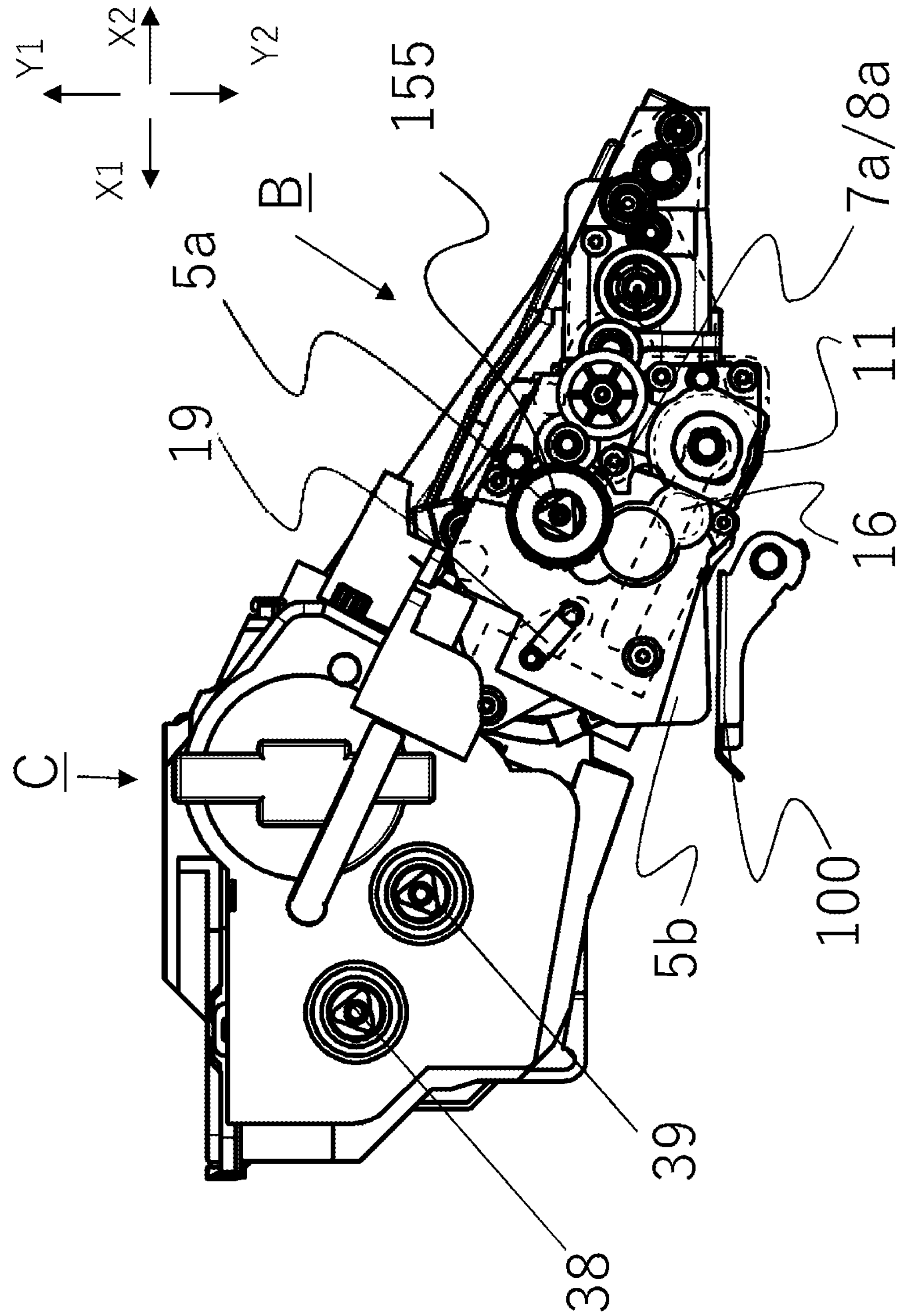
FIG. 11A is a schematic side view illustrating a development unit positioned to make contact with a photosensitive drum.
Figure 11B:
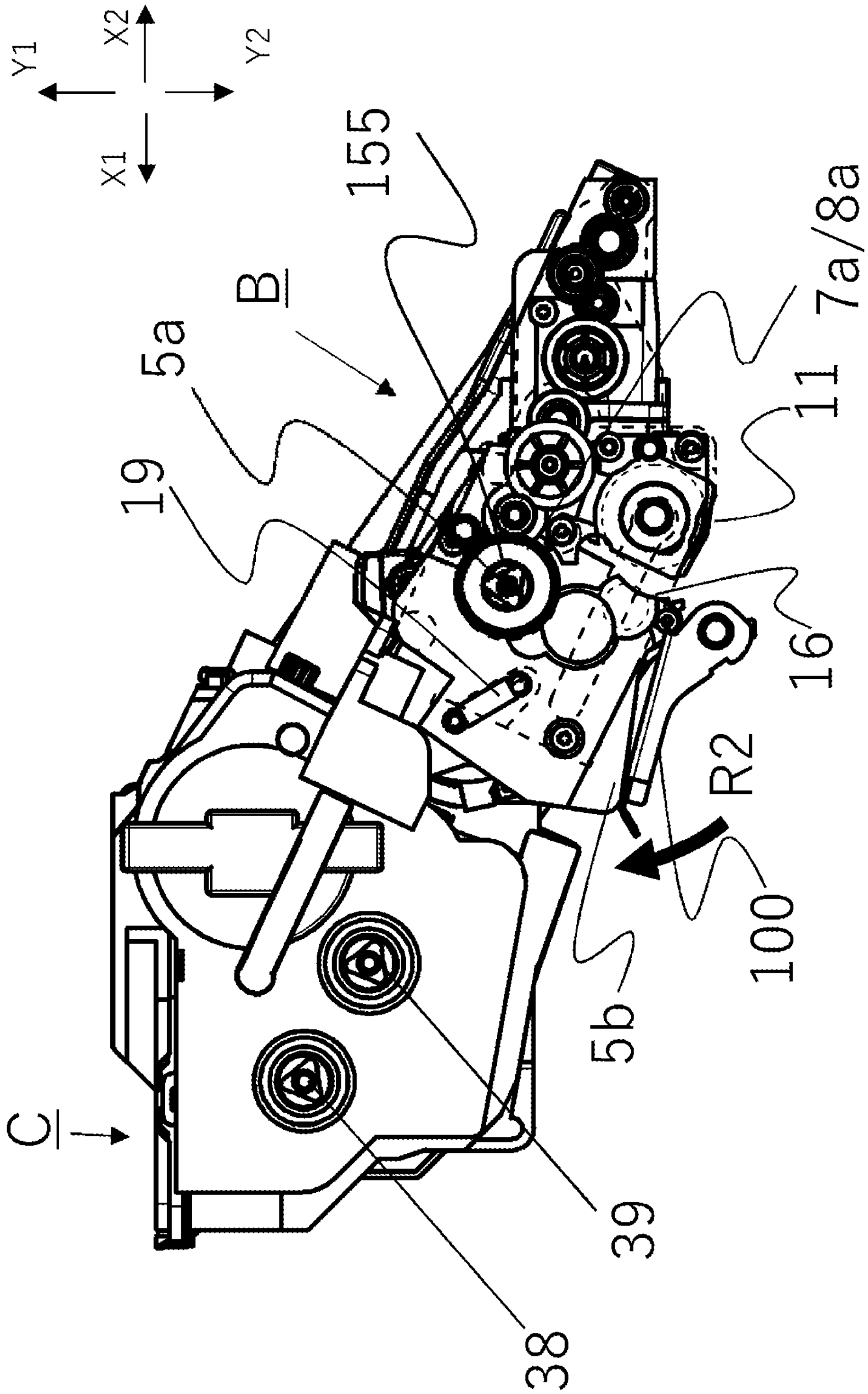
FIG. 11B is a schematic side view illustrating the development unit positioned apart from the photosensitive drum.

As shown in FIG. 10A and FIG. 10B, the cleaning unit 10, which includes the photosensitive drum unit 11, charging roller 12, and cleaning blade 17, is made up of a cleaning unit frame 20, the stay 21, and a side cover 7. The cleaning unit frame 20 supports the cleaning blade 17, charging roller 12, and charging roller cleaner 14. The photosensitive drum unit 11 is rotatably supported by a drum pin 22 attached to the cleaning unit frame 20 on one side, and a photosensitive drum unit support part 7*b* provided to the side cover 7 on the opposite side.

Similarly, the development unit 15 includes the developing roller 16, developing blade 18, development chamber 151, developer container 152, and toner receptacle 153.

As shown in FIG. 10A and FIG. 10B, bearing members 4 and 5 are disposed at both ends in the axial direction of the developing roller 16, and the development unit 15 is coupled to the cleaning unit 10 in a manner rotatable about a pivot axis 8 defined by a line that contains support shafts 8*a* and 8*b*. The development unit 15 is supported on the cleaning unit 10 such as to be rotatable about the pivot axis 8 and such that the pivot axis 8 is disposed substantially parallel to the rotation axis 11*b* of the photosensitive drum unit 11.

The development unit 15 is biased toward the cleaning unit 10 by mechanical springs 19*a* and 19*b* which are resilient members so that the developing roller 16 makes contact with the photosensitive drum unit 11.

Next, how the development unit 15 makes contact with and separates from the cleaning unit 10 is described with reference to FIG. 11A and FIG. 11B. FIG. 11A and FIG. 11B are illustrative diagrams in which the side cover 7 is removed to show a separation mechanism 100 of the printer body A.

As shown in FIG. 11A, the bearing member 5 has a protruded part 5*b*. When the protruded part 5*b* is at a position not touching the separation mechanism 100 as shown in FIG. 11A, the developing roller 16 makes contact with the photosensitive drum unit 11. This state corresponds to the image forming position in which the developing roller 16 develops the latent image formed on the photosensitive drum unit 11.

As shown in FIG. 11B, the photosensitive drum unit 11 and developing roller 16 separate from each other when the separation mechanism 100 provided to the printer body A abuts on the protruded part 5*b* and applies a force, thereby rotating the development unit 15 in direction R2 about the pivot axis 8. This state corresponds to the non-image forming position retracted from the image forming position.

As demonstrated above, the process cartridge B can be switched between a contacting position (image forming position) and a separated position (non-image forming position). The orientation of the development unit 15 relative to the photosensitive drum unit 11 in the process cartridge B is thus switched between the contacting position and the separated position.

General Description of Toner Cartridge C

Figure 7:
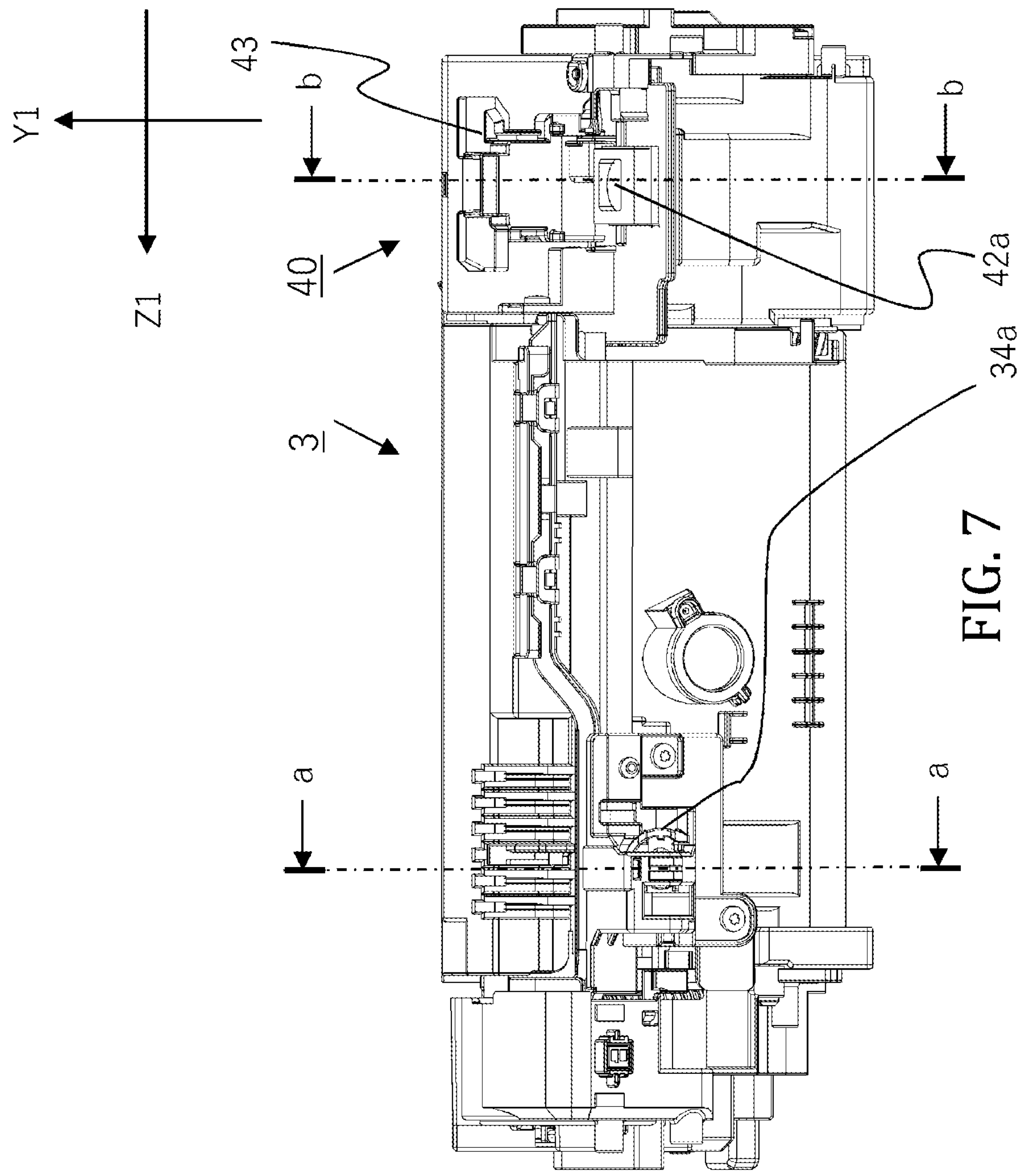
FIG. 7 is a schematic front view illustrating a toner cartridge.
Figure 8:
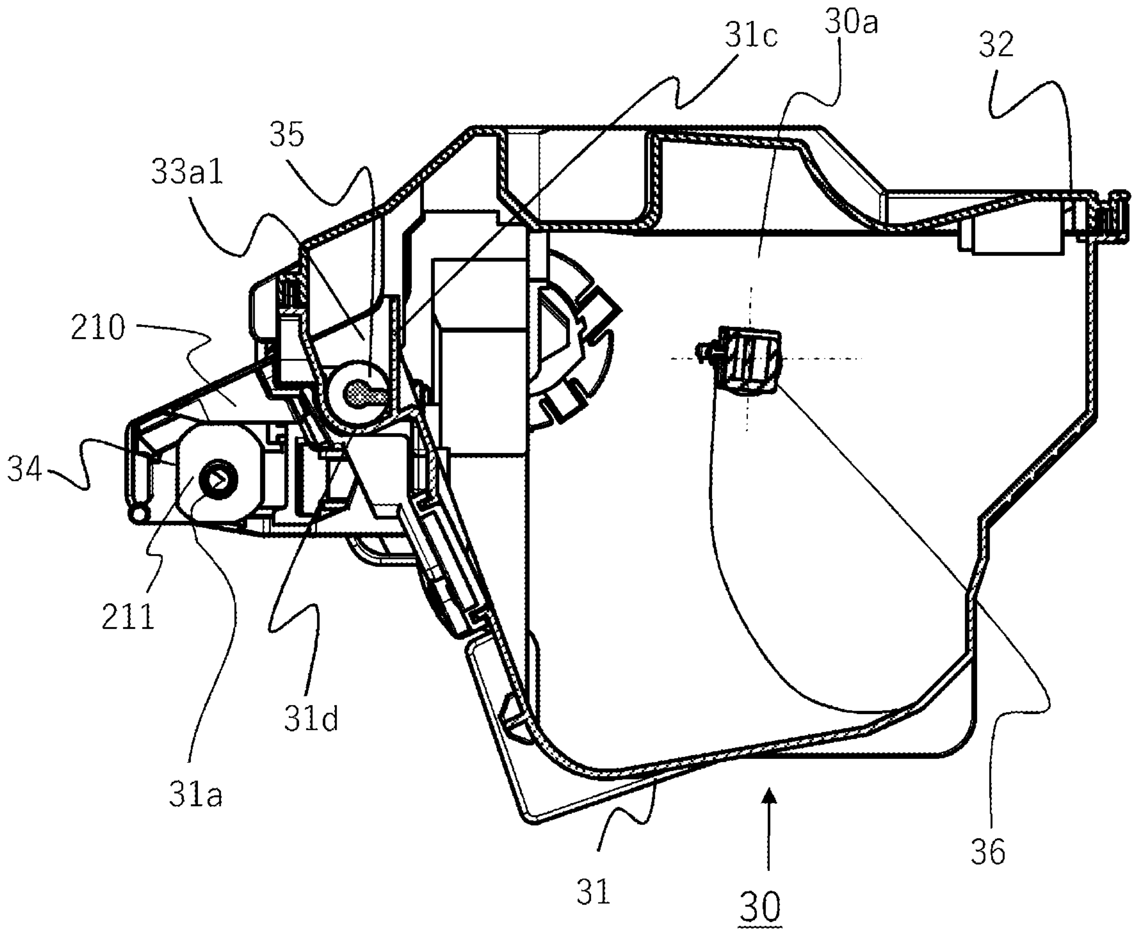
FIG. 8 is a cross-sectional view illustrating a toner supply part of the toner cartridge.
Figure 9:
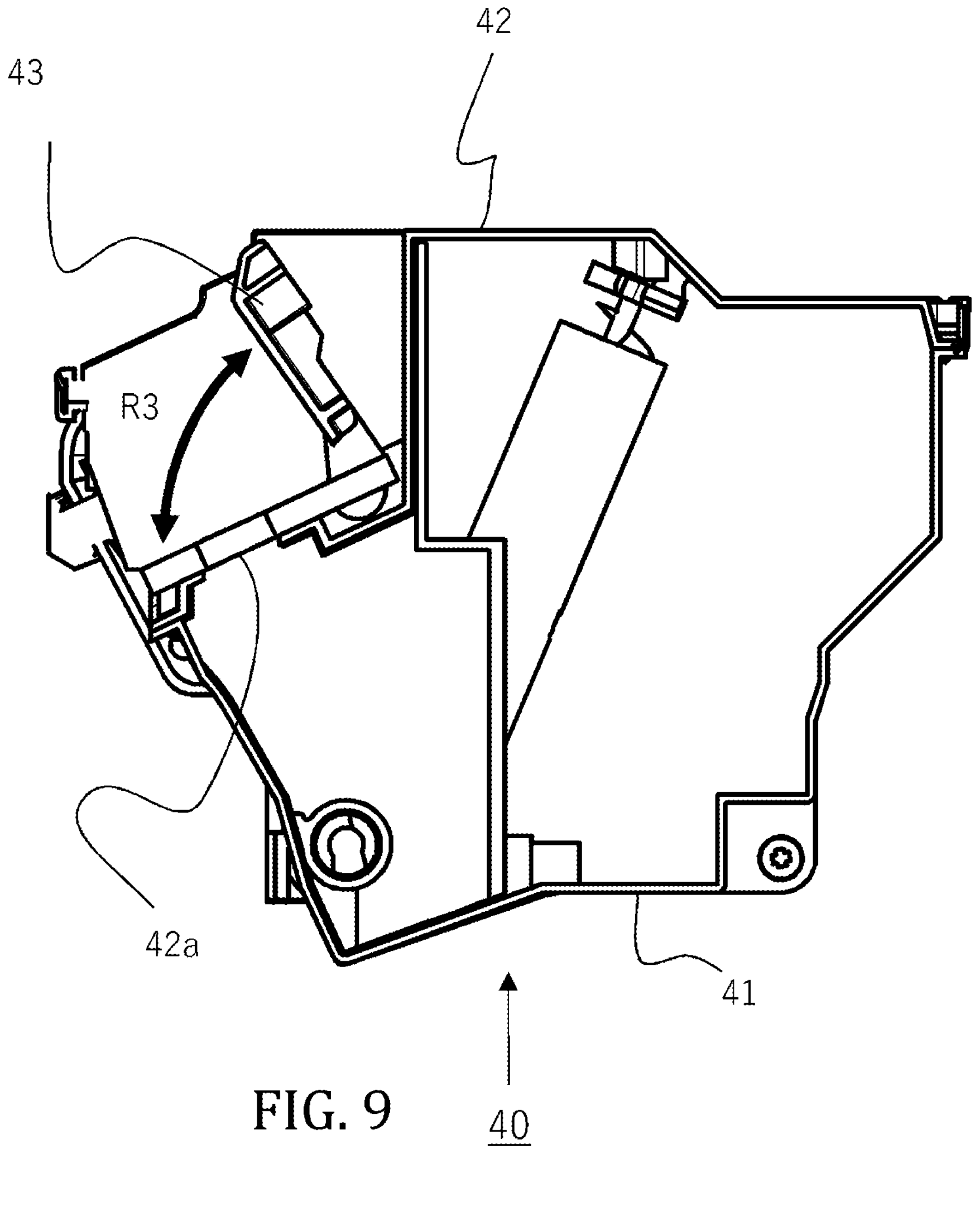
FIG. 9 is a cross-sectional view illustrating a waste toner collecting part of the toner cartridge.
Figure 14A:
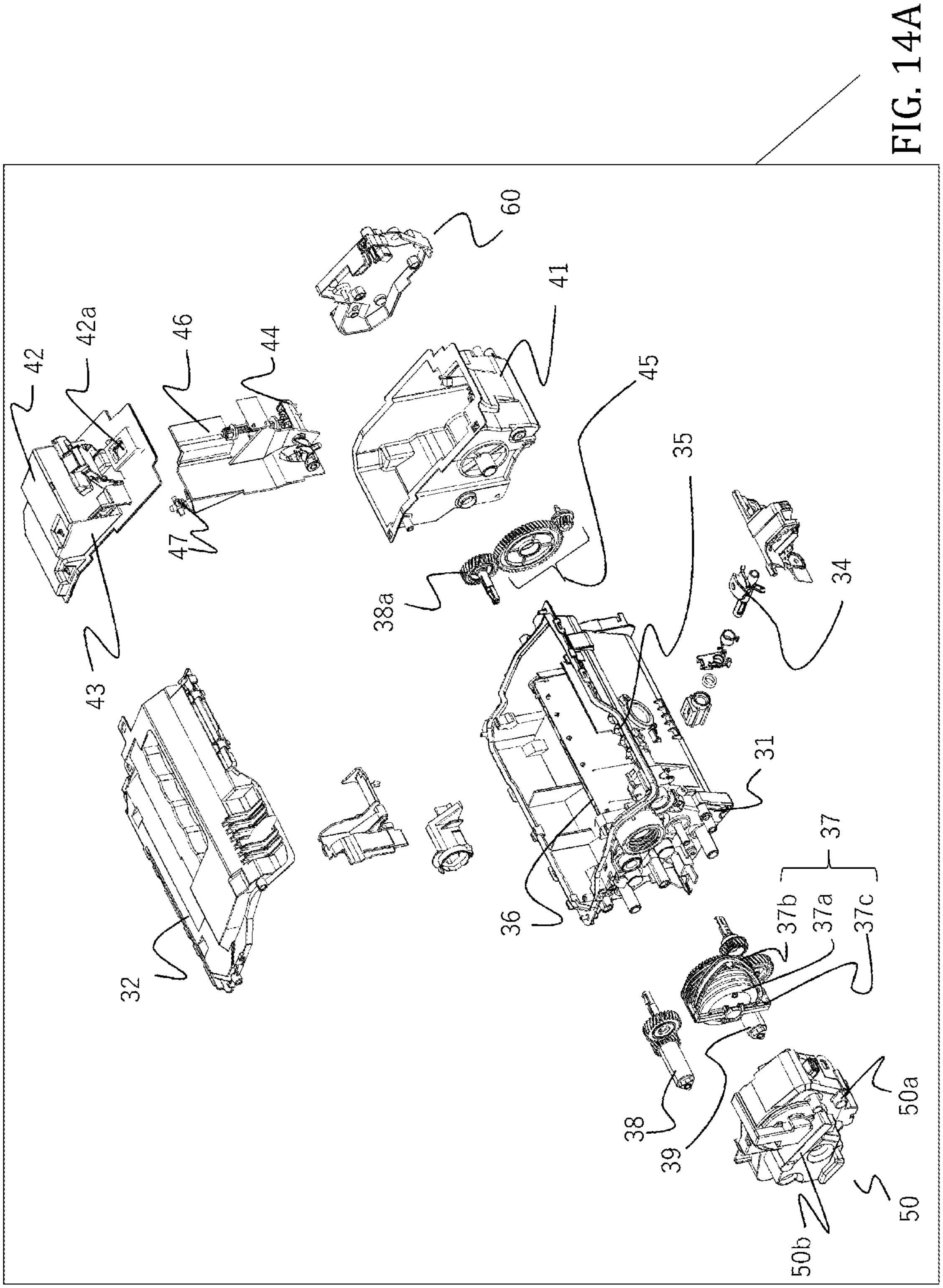
FIG. 14A is an exploded perspective view of the toner cartridge.
Figure 14B:
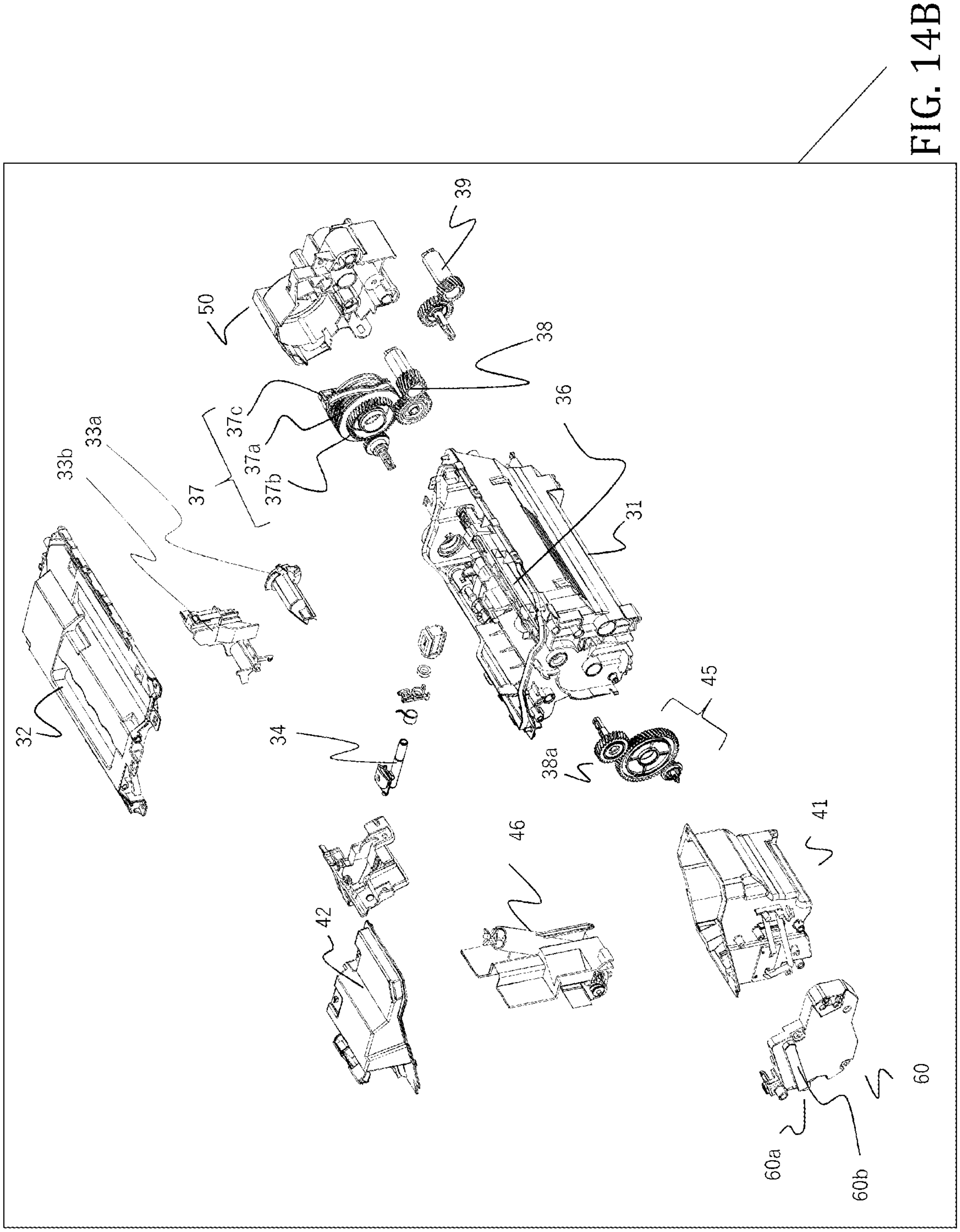
FIG. 14B is an exploded perspective view of the toner cartridge from a different angle.

The toner cartridge C is described with reference to FIG. 7, FIG. 8, FIG. 9, FIG. 14A, FIG. 14B, FIG. 21A, FIG. 21B, and FIG. 22. FIG. 7 is a schematic front view illustrating the toner cartridge C. FIG. 8 is a cross-sectional view (a cross section along a-a of FIG. 7) illustrating a toner supply part 30 of the toner cartridge C. FIG. 9 is a cross-sectional view (a cross section along b-b of FIG. 7) illustrating a waste toner collecting part of the toner cartridge C. FIG. 14A and FIG. 14B are exploded perspective views of the toner cartridge C.

Figure 21A:
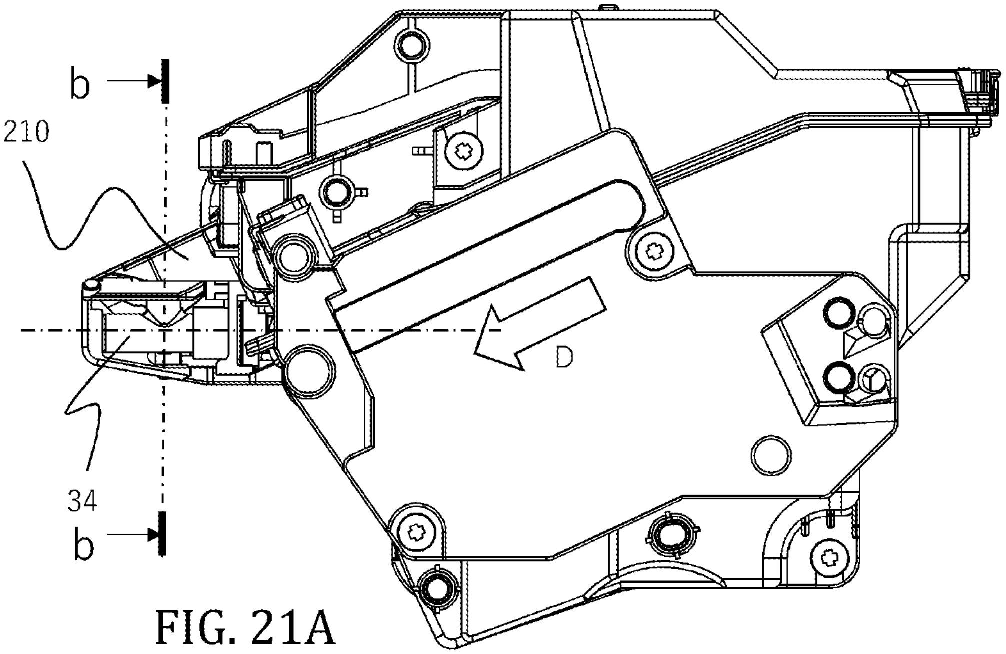
FIG. 21A is a side view and FIG. 21B is a cross-sectional view explaining the movement of a toner outlet of a shutter member.
Figure 21B:
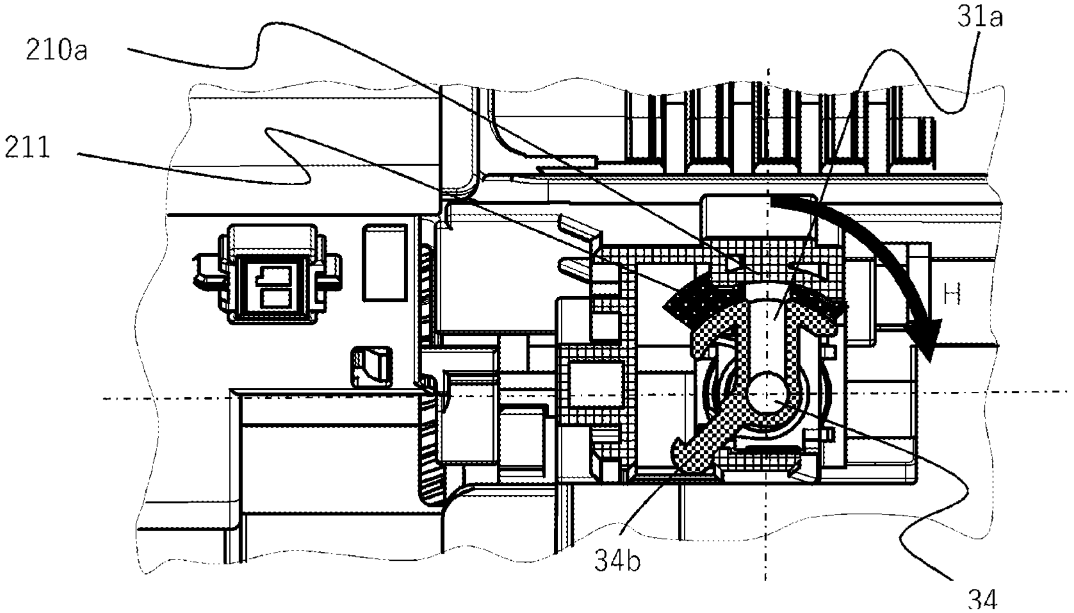
Figure 22:
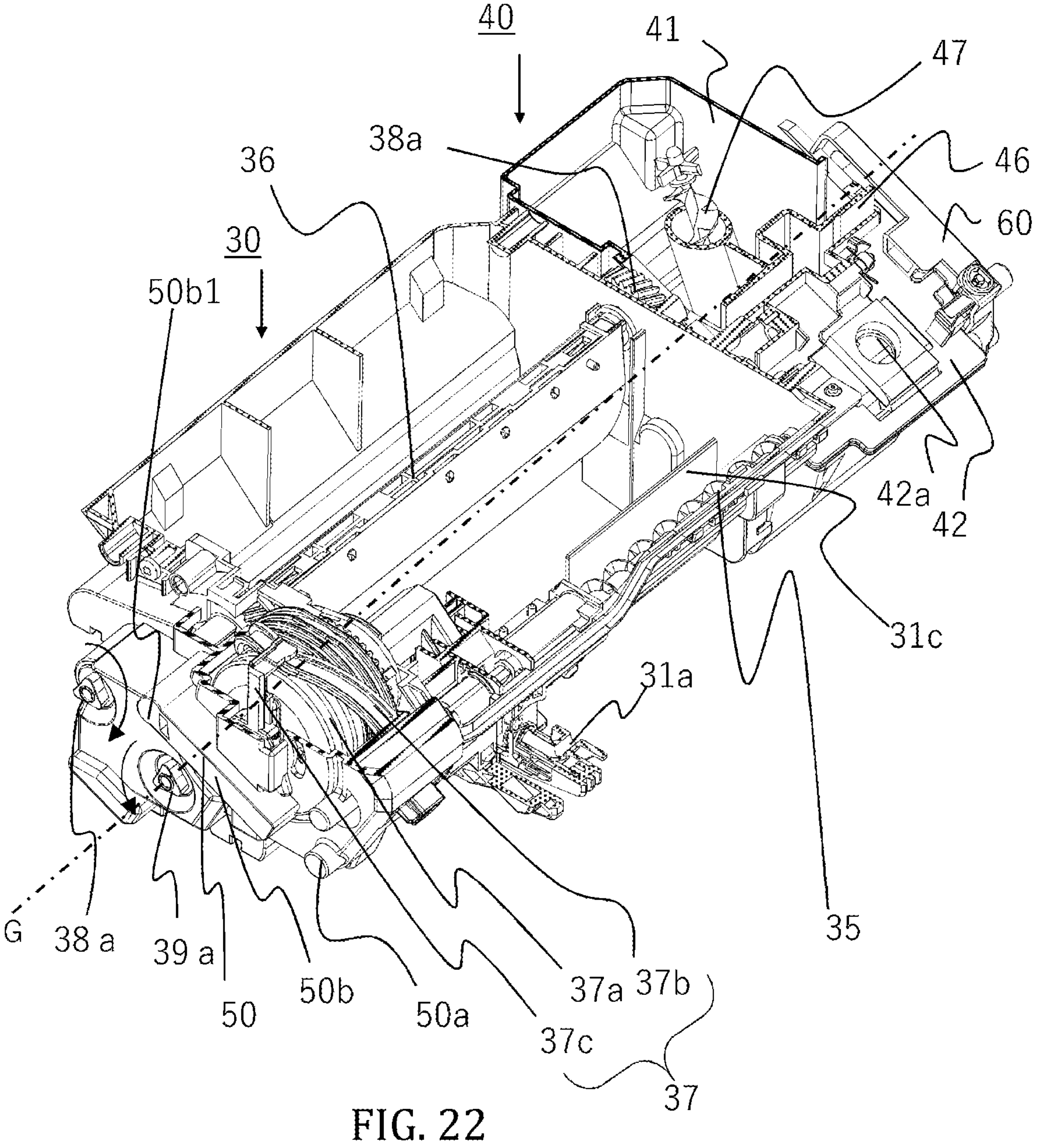
FIG. 22 is a cross-sectional perspective view of the toner cartridge.

FIG. 21A and FIG. 21B are cross-sectional views explaining the movement of a toner outlet 31*a* of a shutter member 34 in the toner cartridge C. FIG. 22 is a cross-sectional perspective view of the toner cartridge C.

As shown in FIG. 8 and FIG. 9, the toner cartridge includes the toner supply part that supplies toner to the process cartridge B, and the waste toner collecting part 40 that collects waste toner from the process cartridge B.

A general description of the toner supply part 30 is given below. The toner supply part 30 has a supply part frame 31 and a supply part lid 32 that form a toner container 30*a*, as shown in FIG. 8, FIG. 9, FIG. 14A, FIG. 14B, FIG. 21A, FIG. 21B, and FIG. 22. The toner supply part 30 includes the toner outlet 31*a* from which toner is discharged from the toner container 30*a*. The toner outlet 31*a* is provided at the distal end (downstream in the mounting direction of the toner cartridge C) of the shutter member 34 that opens and closes in coordination with the mounting of the toner cartridge C. An outlet seal member 211 is attached around the toner outlet 31*a* of the shutter member 34.

As shown in FIG. 21B, the upwardly oriented toner outlet 31*a* can be rotated to a horizontal orientation by rotation of the shutter member 34. Namely, the orientation of the toner outlet 31*a* can be switched between a first direction along the longitudinal direction and a second direction different from the first direction. A shutter protection member 210 is disposed around the shutter member 34. The shutter protection member 210 has an outlet seal abutment surface 210*a* that makes contact with the outlet seal member 211 when the toner outlet 31*a* is oriented upward to seal the toner outlet 31*a*. The shutter member 34 rotates in direction H in coordination with the mounting of the toner cartridge C so that the toner outlet 31*a* is oriented horizontally. The shutter protection member 210 has an opening through which the toner outlet 31*a* is exposed when the toner outlet 31*a* of the shutter member 34 is oriented horizontally. This allows the toner to be discharged from the toner container 30*a*.

As shown in FIG. 8 and FIG. 22, the toner container 30*a* includes a toner container screw member 35 that transports the toner toward the toner outlet 31*a*, and a toner container agitation/transport unit 36 that transports the toner toward the toner container screw member 35. The toner transported to the toner outlet 31*a* is discharged by a volume change in a pump 37*a*.

How a volume change is created in the pump 37*a* is explained. A rotating drive force is supplied from the printer body A to a pump screw coupling portion 39*a*, which is a protrusion on a pump screw input part 39. This rotation is converted to a reciprocating movement by a cam 37*b* and a link arm 37*c*. The pump 37*a* in a bellows shape is extended and contracted using this reciprocating movement, which creates a volume change.

The inventors assumed that there could be a case where toner contamination of a component downstream of the direction in which toner is ejected is not desirable, and considered a method of preventing such contamination. This issue could become more significant in the case in particular where a mixture of air and toner is discharged from the pump. Components whose contamination is not desirable include the pump screw coupling portion 39*a* or drive trains for example, which are moving parts. Other examples of components that should not be contaminated include contacts and terminals that are conductive members for power supply.

The toner is discharged from the toner outlet 31*a* in a direction away from the pump screw coupling portion 39*a*. As a result, the toner is ejected from one of the ends in the longitudinal direction where the pump screw coupling portion 39*a* is provided toward the other end where the pump screw coupling portion 39*a* is not provided. Accordingly, toner contamination of the pump screw coupling portion 39*a* can be prevented even if the toner should leak during ejection.

Next, a general description of the waste toner collecting part 40 is given below. As shown in FIG. 9, the waste toner collecting part 40 has a waste toner container frame 41 and a waste toner container lid 42 that form a waste toner container. The waste toner container lid 42 is provided with a waste toner inlet 42*a*. The waste toner collecting part 40 includes a waste toner shutter member 43 that opens and closes the waste toner inlet 42*a*. The waste toner shutter member 43 opens and closes in direction R3 in coordination with the mounting of the toner cartridge C to the printer body A.

Mounting and Removal of Process Cartridge B and Toner Cartridge C

Figure 12A:
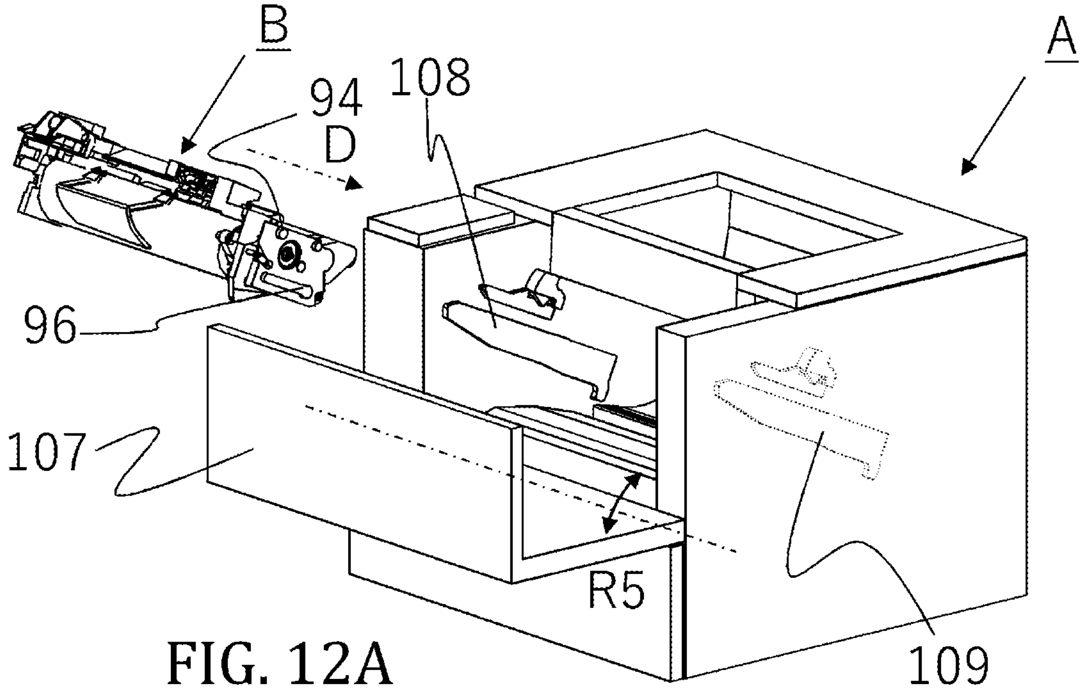
FIG. 12A and FIG. 12B are schematic perspective views illustrating how the process cartridge and toner cartridge are mounted.
Figure 12B:
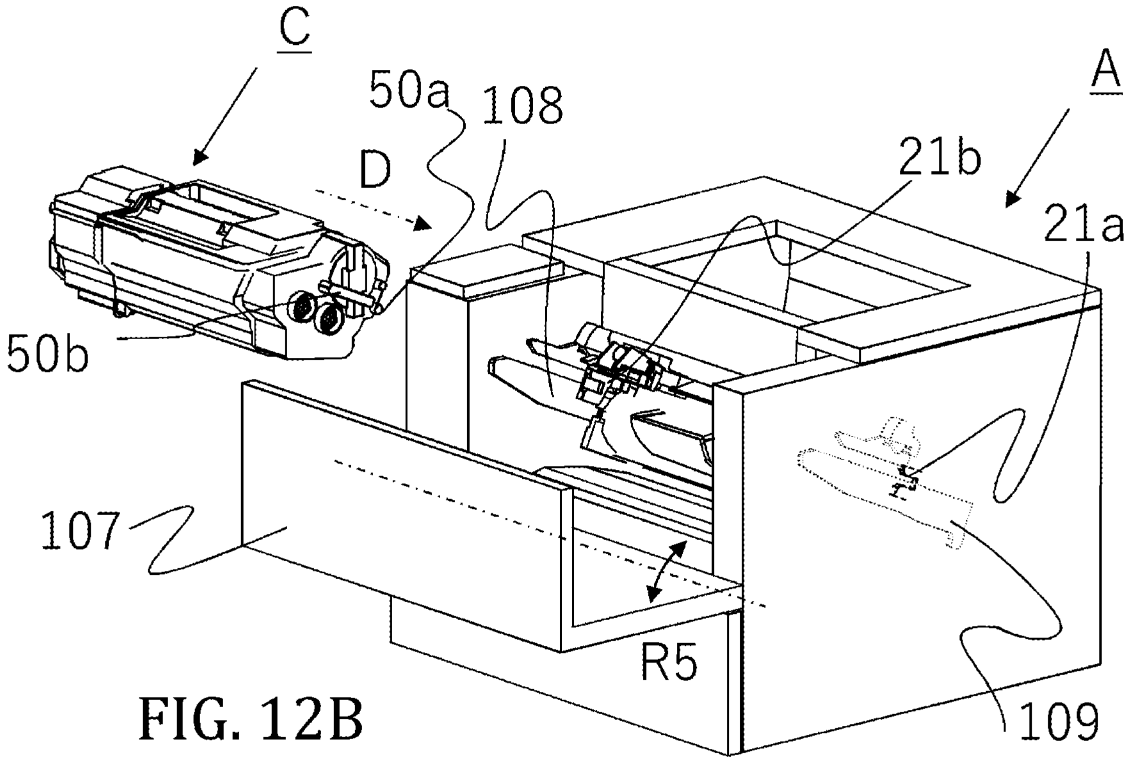
Figure 13A:
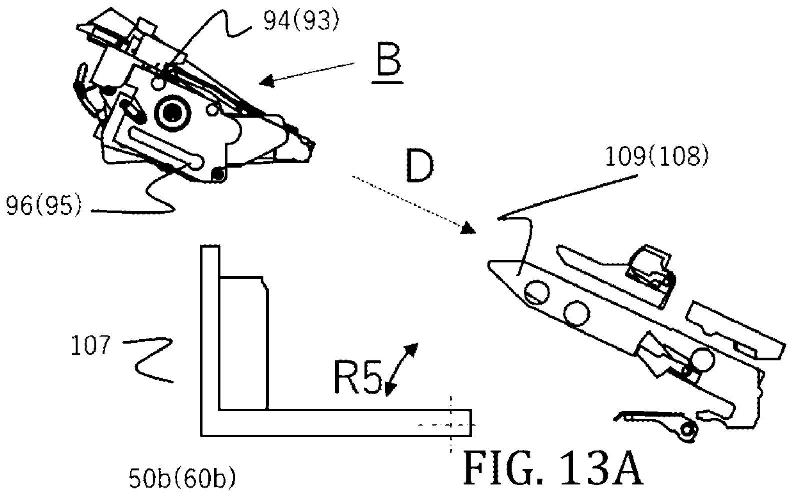
FIG. 13A to FIG. 13C are schematic side views illustrating how the process cartridge and toner cartridge are mounted.
Figure 13B:
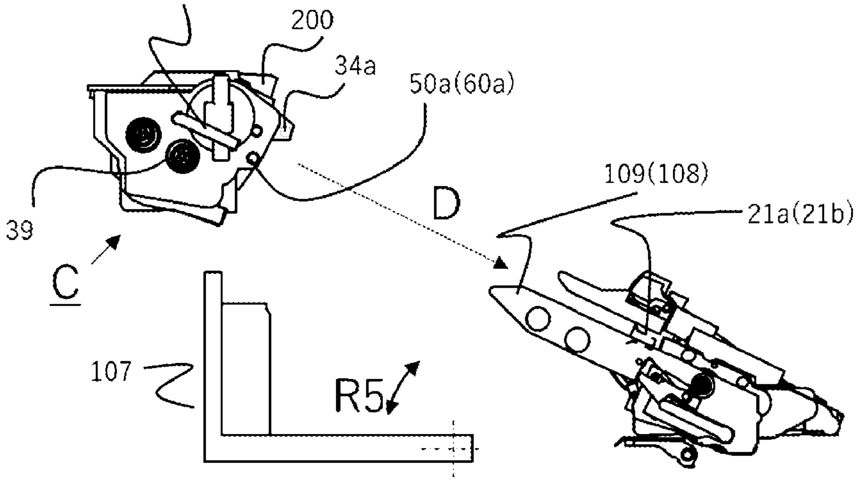
Figure 13C:
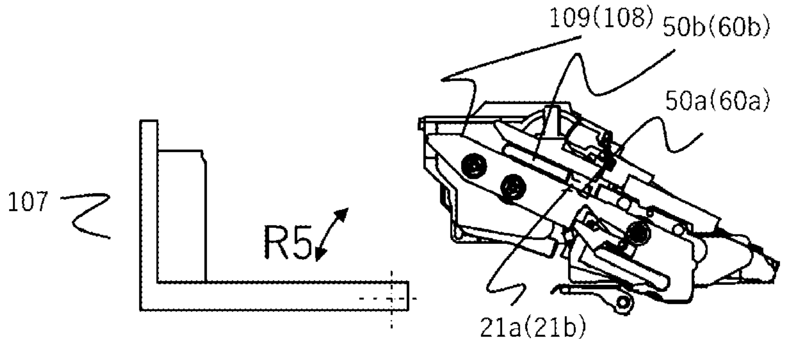

Next, how the process cartridge B and toner cartridge C are mounted to and removed from the printer body A is described with reference to FIG. 12A, FIG. 12B, and FIG. 13A to FIG. 13C. FIG. 12A and FIG. 12B are schematic perspective views explaining how the process cartridge B and toner cartridge C are mounted to the printer body A. FIG. 13A to FIG. 13C are schematic side views explaining how the process cartridge B and toner cartridge C are mounted to the printer body A.

As shown in FIG. 12A, the printer body A has a space in its interior where the process cartridge B and toner cartridge C are mounted. An open/close door 107 is provided to the printer body A in a manner rotatable about a rotation axis R5. FIG. 12A shows an open state of the open/close door 107.

The printer body A includes guide portions 108 and 109. The process cartridge B is provided with upper bosses 93 and 94 and lower bosses 95 and 96 on both left and right sides as shown in FIG. 10A and FIG. 10B.

First, the process cartridge B is mounted to the printer body A. As shown in FIG. 12A and FIG. 13A, the process cartridge B is inserted in the direction of arrow D, with the guide portions 108 and 109 respectively positioned between the upper boss 93 and lower boss 95 (FIG. 10B) and the upper boss 94 and lower boss 96 (FIG. 10A) and thereby guiding the process cartridge B.

The toner cartridge C has positioning bosses 50*a* and 60*a* at the front in the mounting direction, and guided portions 50*b* and 60*b* downstream of the positioning bosses 50*a* and 60*a* in the mounting direction as shown in FIG. 14A and FIG. 14B. The process cartridge B has toner cartridge positioning portions 21*a* and 21*b* on the stay 21 as shown in FIG. 10B.

The toner cartridge is inserted in the direction of arrow D, with the guided portions 50*b* and 60*b* respectively placed on the guide portions 108 and 109, as shown in FIG. 12B and FIG. 13B.

When the toner cartridge C is completely inserted as shown in FIG. 13C, the positioning bosses 50*a* and 60*a* (FIG. 14A and FIG. 14B) fit into the toner cartridge positioning portions 21*a* and 21*b* (FIG. 10B), respectively. In this state, the distal ends in the inserting direction of the guided portions 50*b* and 60*b* are separated from the guide portions 108 and 109, while the rear ends are in contact with the guide portions 108 and 109. The toner cartridge C is thus set in position relative to the process cartridge B. The rear ends of the guided portions 50*b* and 60*b* being in contact with the guide portions 108 and 109 determine the position of the toner cartridge C inside the printer body A.

After the process cartridge B and toner cartridge C have been inserted and the open/close door 107 is closed, the printer is ready to form images. To remove the toner cartridge C and process cartridge B, the process described above is carried out in reverse order.

Toner Replenishment Path of Process Cartridge B

Figure 15A:
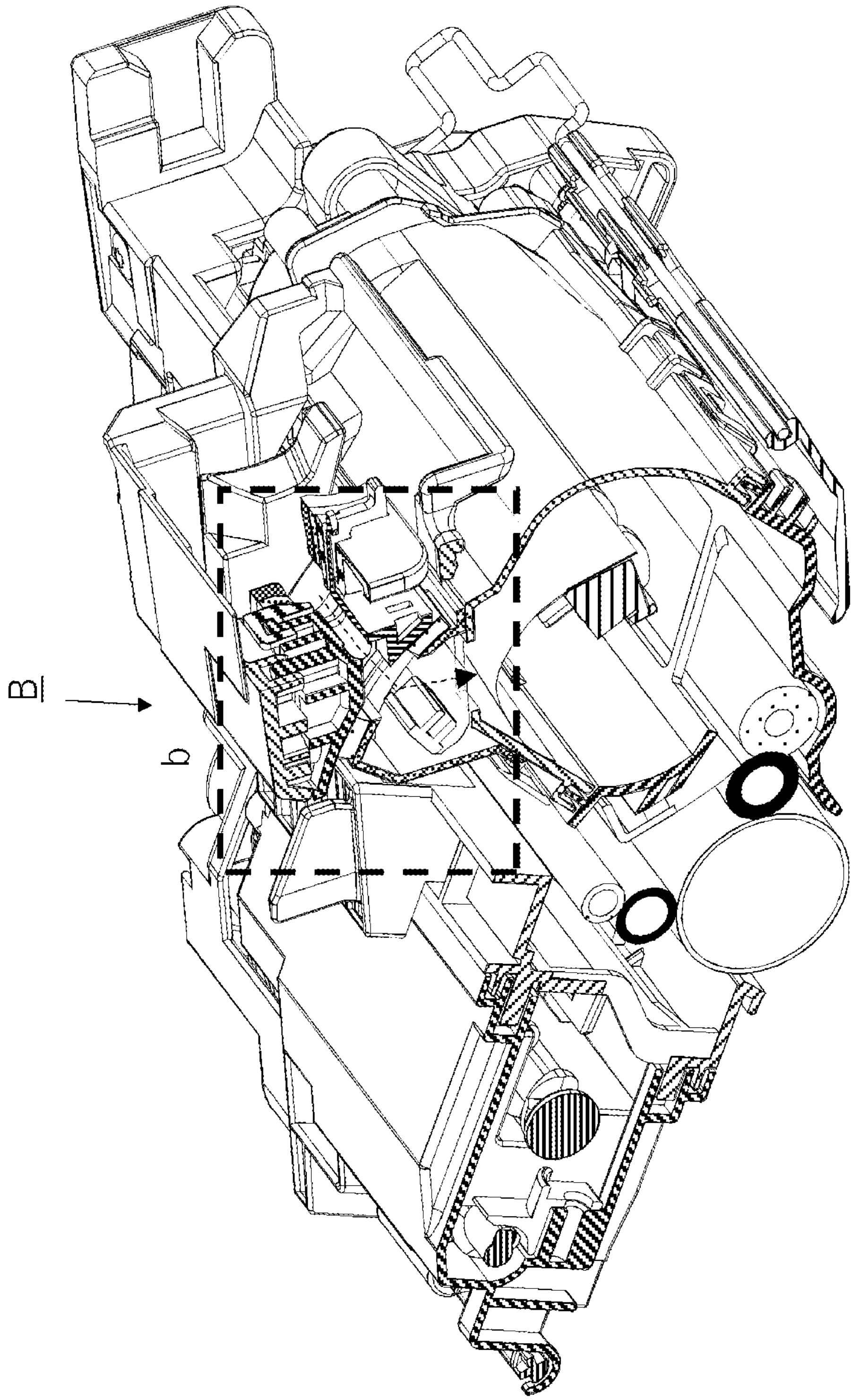
FIG. 15A is a cross-sectional perspective view illustrating the replenishment port of the process cartridge.
Figure 15B:
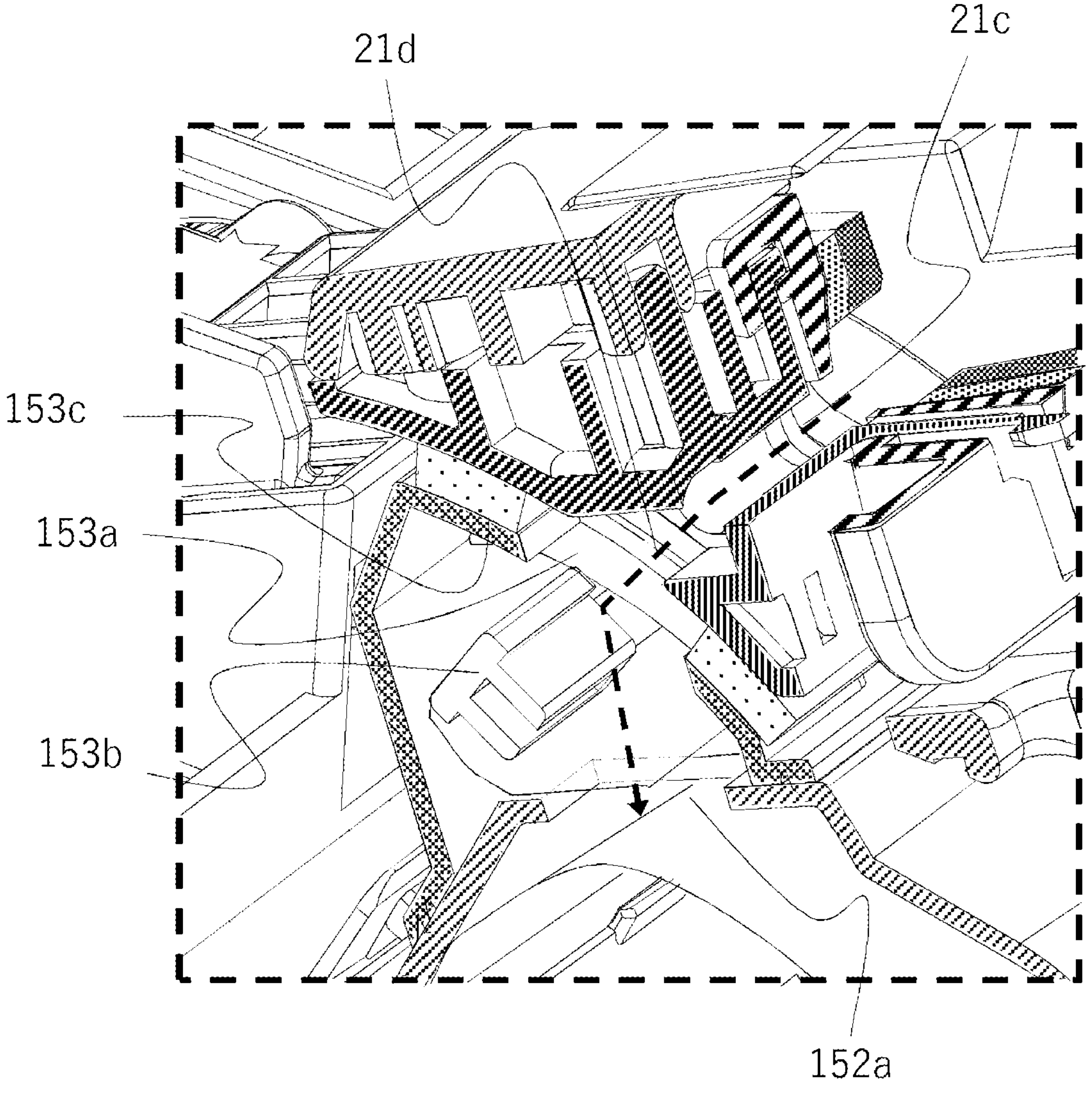
FIG. 15B is an enlarged cross-sectional perspective view illustrating the replenishment port of the process cartridge.
Figure 16A:
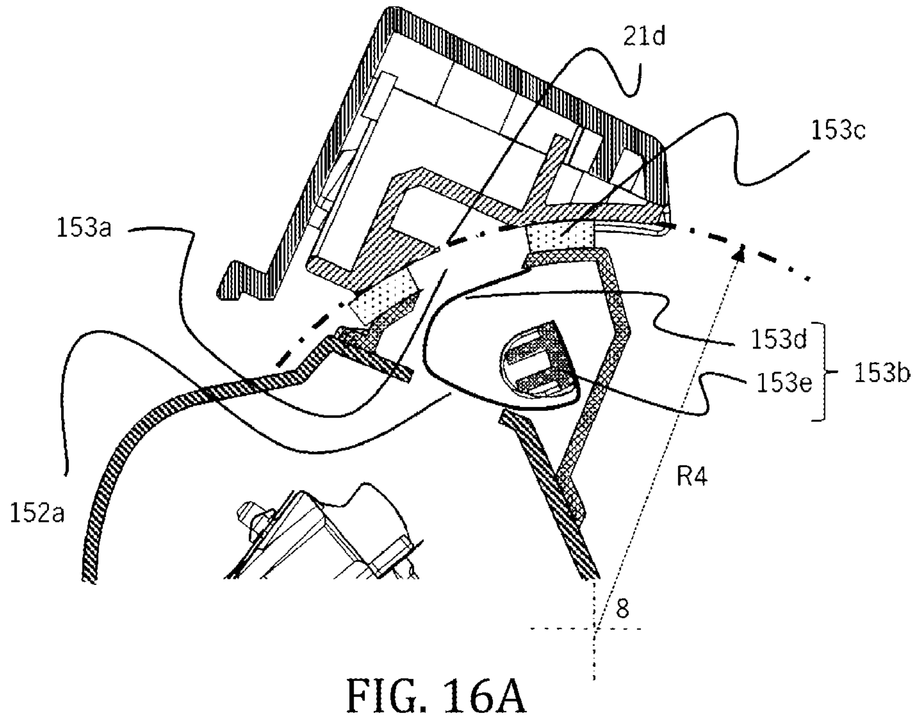
FIG. 16A and FIG. 16B are schematic cross-sectional views illustrating the relationship between the toner receptacle and a stay at a contacting position and a separated position.
Figure 16B:
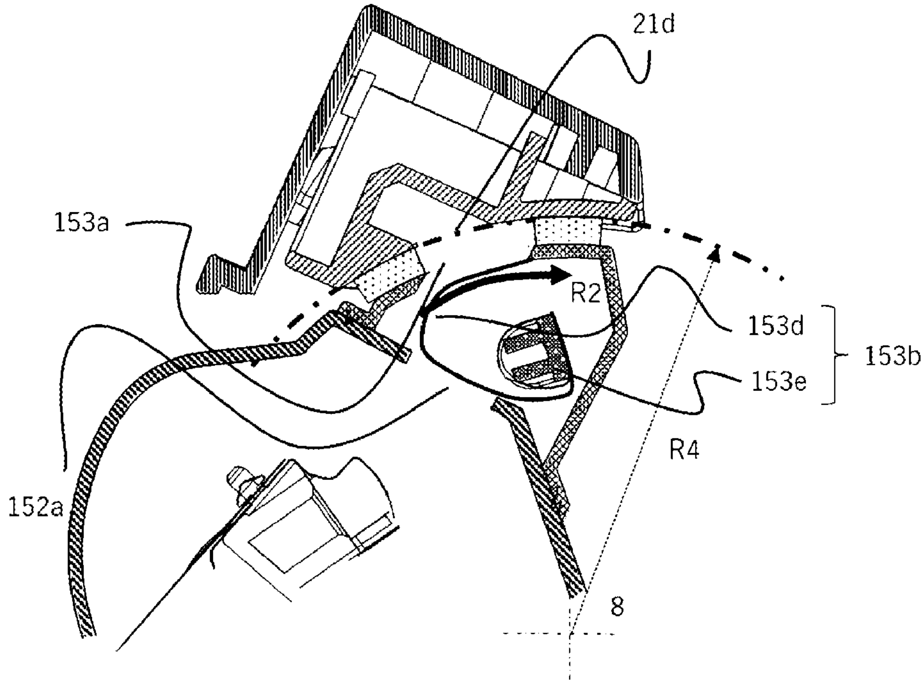

Next, the toner replenishment path of the process cartridge B is described with reference to FIG. 15A, FIG. 15B, FIG. 16A, FIG. 16B, FIG. 23, FIG. 24, FIG. 25, FIG. 26, and FIG. 27. FIG. 15A and FIG. 15B are a cross-sectional perspective view and an enlarged view illustrating the replenishment port of the process cartridge B. FIG. 16A and FIG. 16B are schematic cross-sectional views illustrating the relationship between the toner receptacle 153 and the stay 21 when the development unit 15 makes contact with and separates from the photosensitive drum unit 11 in the process cartridge B.

Figure 23:
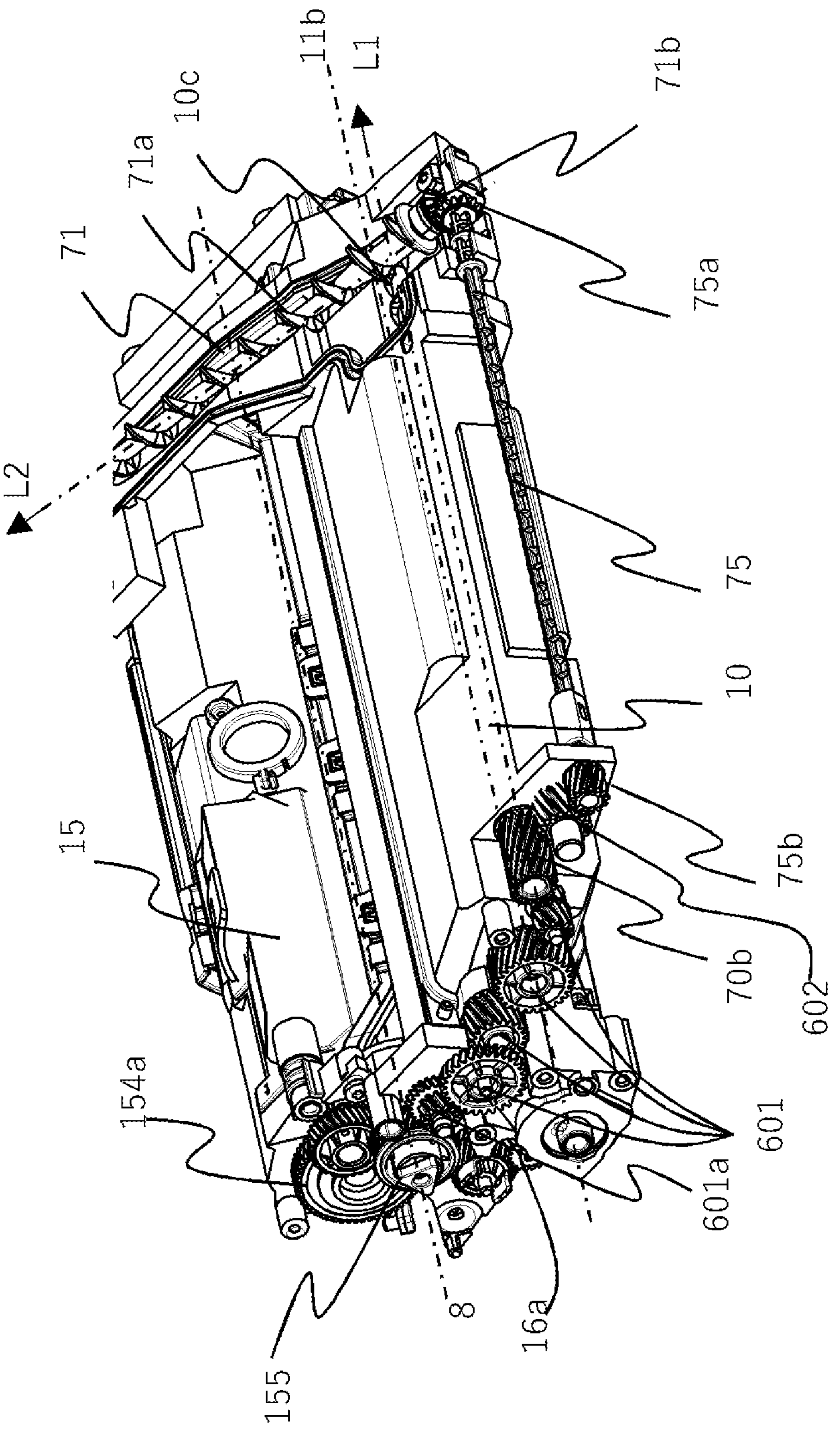
FIG. 23 is a perspective view illustrating a drive train for the development unit of the process cartridge.
Figure 24:
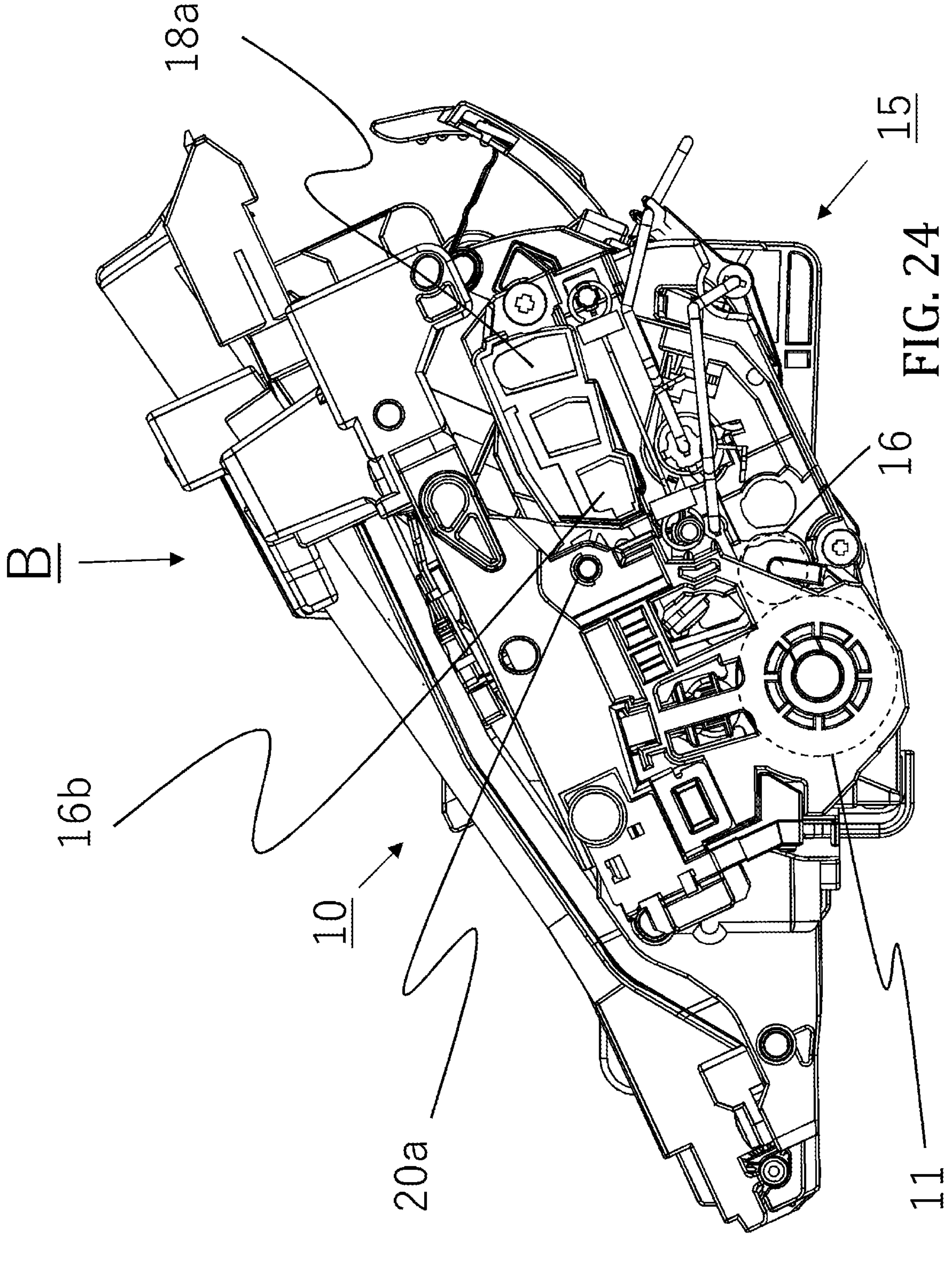
FIG. 24 is a side view of the process cartridge.
Figure 25:
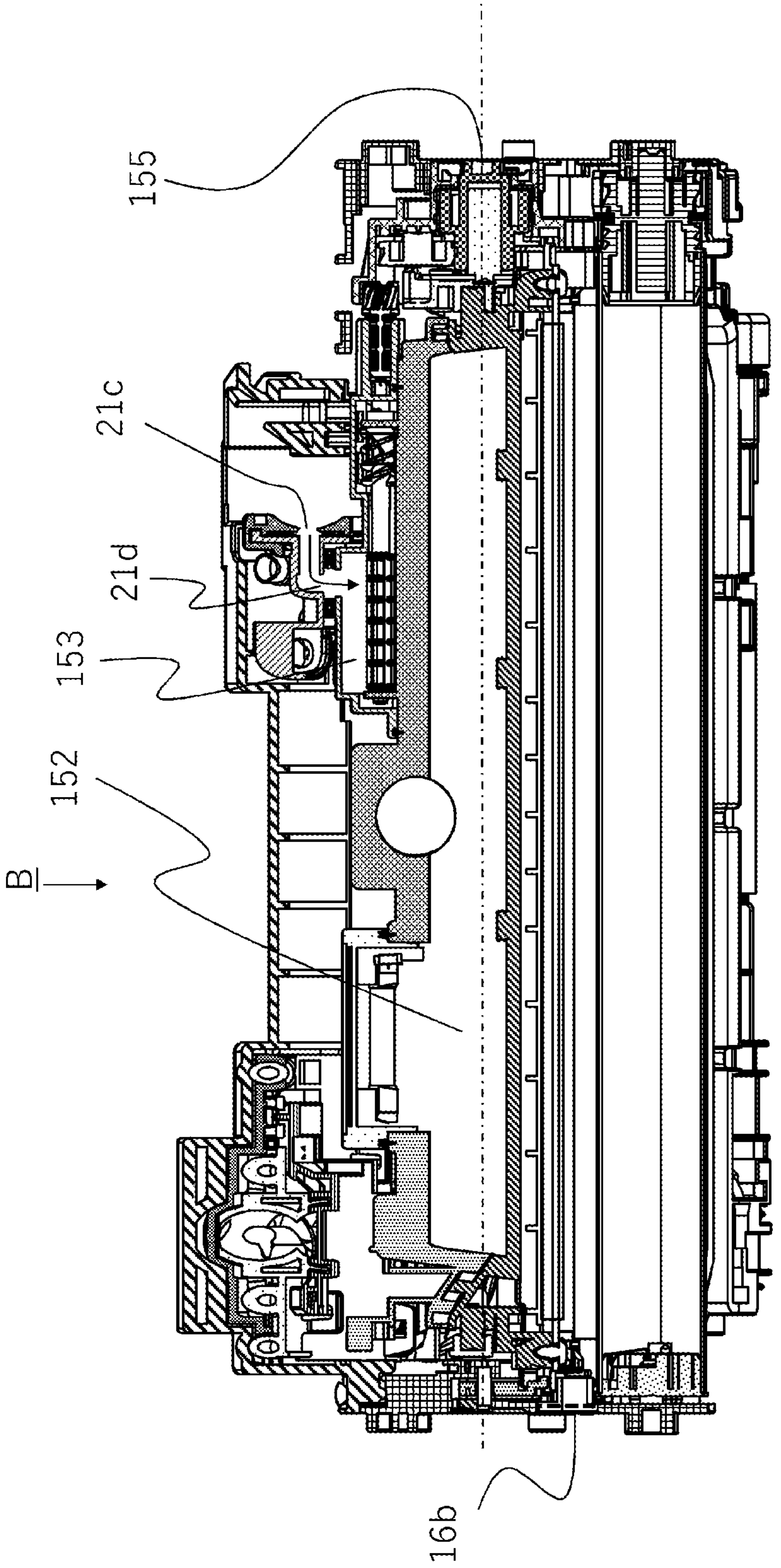
FIG. 25 is a schematic cross-sectional view illustrating the positions in the longitudinal direction of the replenishment port, a development unit coupling, and a development unit contact.
Figure 26:
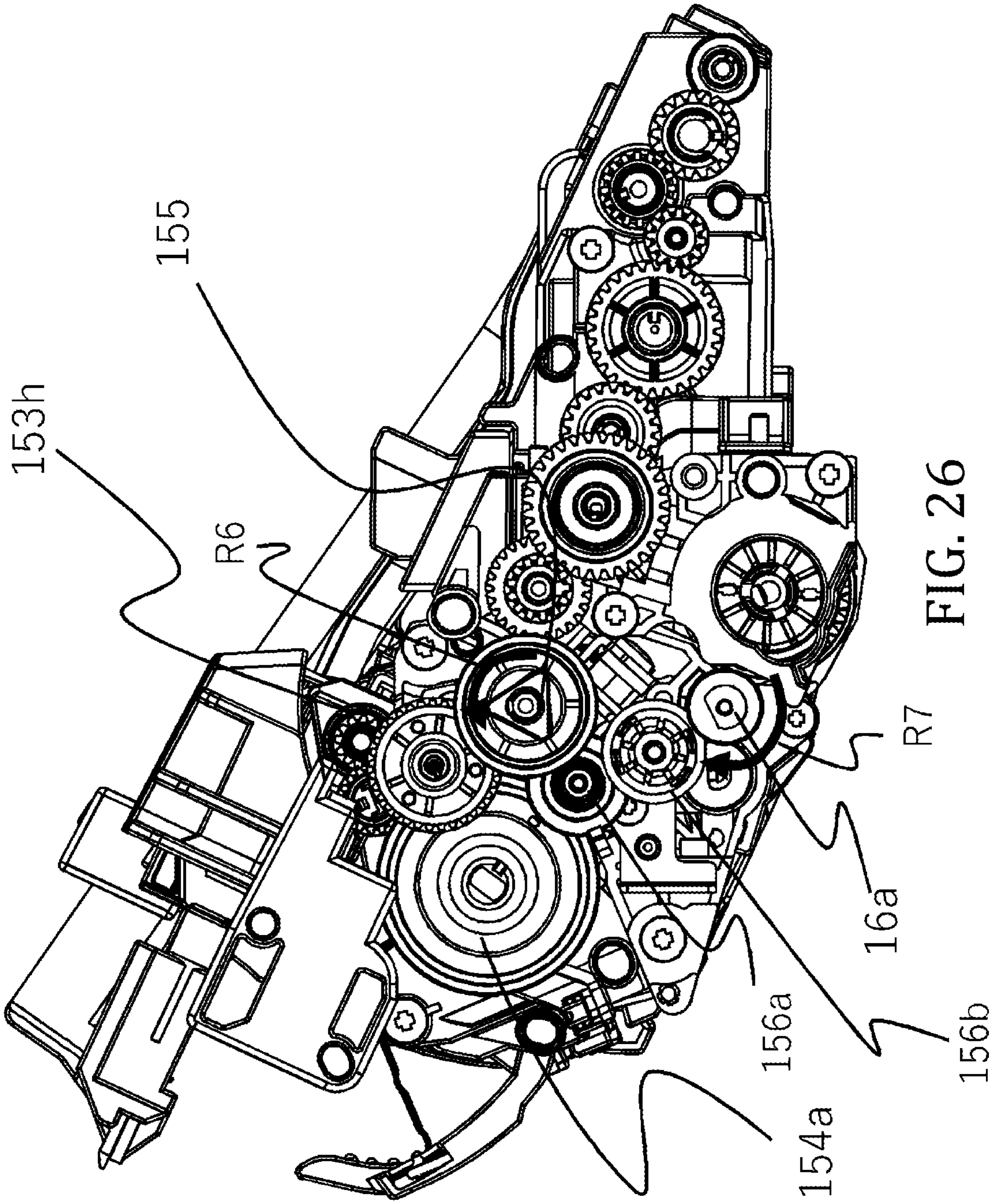
FIG. 26 is a side view illustrating the drive train for the development unit of the process cartridge.
Figure 27:
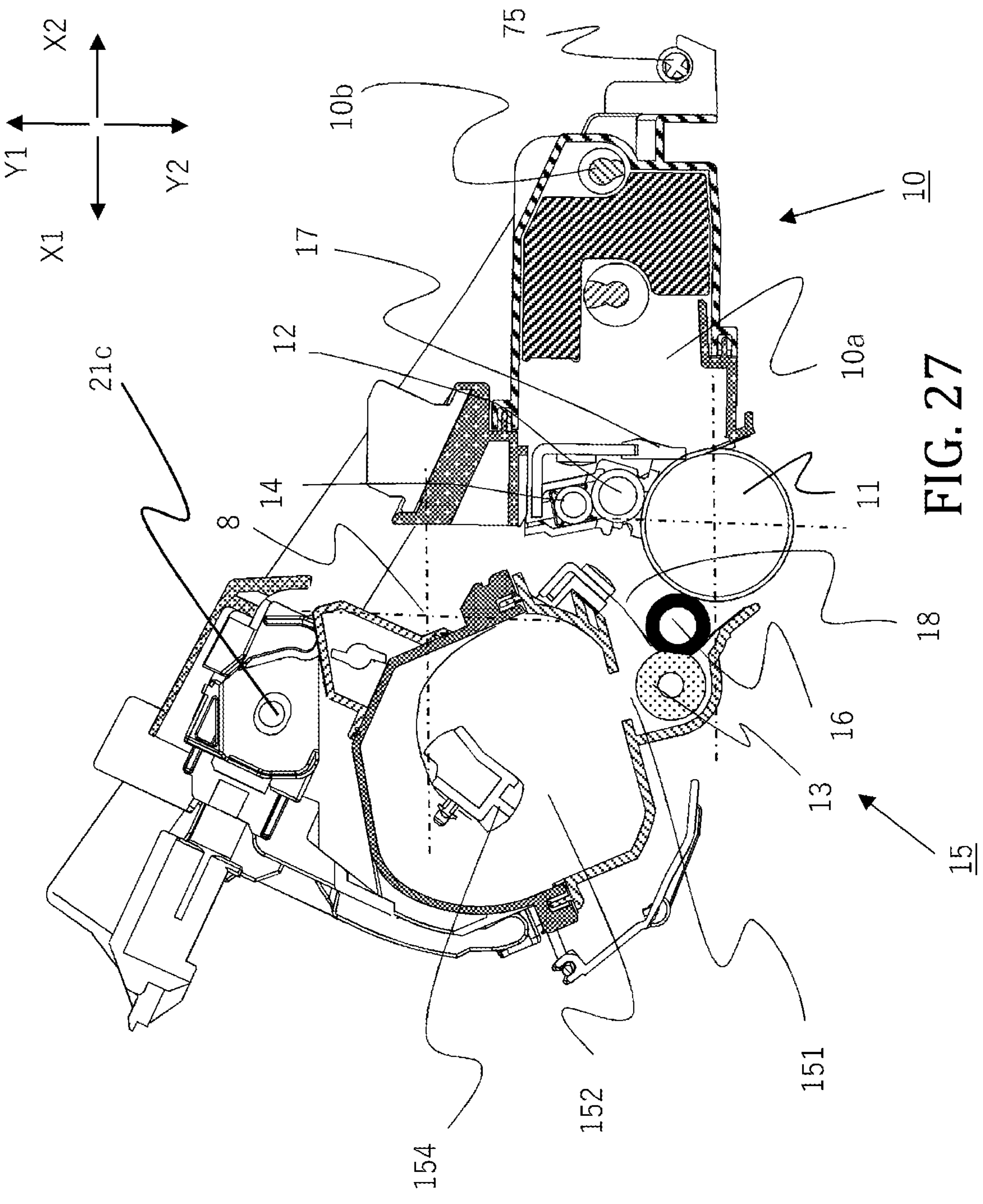
FIG. 27 is a schematic cross-sectional view illustrating the replenishment port of the process cartridge.

FIG. 23 is a perspective view illustrating the drive train for the development unit in the process cartridge B. FIG. 24 is a side view of the process cartridge B. FIG. 25 is a schematic cross-sectional view illustrating the positions in the longitudinal direction of the replenishment port 21*c*, a development unit coupling 155, and a development unit contact 16*b* of the process cartridge B. FIG. 26 is a side view illustrating the drive train for the development unit in the process cartridge B. FIG. 27 is a schematic cross-sectional view illustrating the replenishment port of the process cartridge.

As described above, the process cartridge B is replenished with toner by the toner cartridge C connected thereto. Namely, the stay 21 has the replenishment port 21*c* for receiving toner from the toner outlet 31*a* of the toner cartridge C as shown in FIG. 15A, FIG. 15B, FIG. 16A, and FIG. 16B. The toner received from the replenishment port 21*c* is transported to an inlet 153*a* of the toner receptacle 153 of the development unit 15 via the delivery port 21*d* and into the toner receptacle 153. A toner transport member 153*b* delivers the toner replenished to the toner receptacle 153 further into the developer container 152 (FIG. 6) through a developer container inlet 152*a*. In this embodiment, the toner transport member (transport member) as a transport means moves forward the toner in a transport direction in a transport region that is a region in a cavity 302 in which the replenished toner is transported.

The toner transport direction is explained. The replenishment port 21*c* receives toner from the toner outlet 31*a*, and is therefore disposed horizontally (along the longitudinal direction) similarly to the toner outlet 31*a* as shown in FIG. 15A and FIG. 15B. The toner received from the replenishment port 21*c* is first moved forward horizontally and then at right angles toward a direction perpendicular to the pivot axis 8 to be transported to the delivery port 21*d*.

An inlet seal member 153*c* is affixed around the inlet 153*a* to provide a seal between the delivery port 21*d* and the inlet 153*a*.

As shown in FIG. 11A, FIG. 11B, FIG. 23, and FIG. 26, the development unit 15 of the process cartridge B is provided with the development unit coupling 155, which is a drive input member for receiving a drive force from the printer body A. The development unit coupling 155 transmits torque to a developing roller gear 16*a*, a stirrer gear 154*a*, and a toner transporter gear 153*h*, which respectively transmit the torque to the developing roller 16, stirrer 154, and toner transport member 153*b*.

The development unit coupling 155 is disposed to have the pivot axis 8 at its rotation center as shown in FIG. 11A, FIG. 11B, and FIG. 26. The rotating direction R6 of the development unit coupling 155 is the direction in which the developing roller 16 is brought into contact with the photosensitive drum unit 11 as shown in FIG. 26. The developing roller 16 is rotated in direction R7, which is the direction in which the developing roller is rotated by the photosensitive drum unit 11. Idler gears 156*a* and 156*b* are disposed between the development unit coupling 155 and the developing roller gear 16*a* to allow more freedom in the positioning of the development unit coupling 155 relative to the developing roller 16 without changing the rotating directions R6 and R7 mentioned above. Any even number of idler gears may be provided to achieve the similar effect. Increasing the number of gears leads to a poorer transmission efficiency and therefore a desirable number of idler gears is two.

As shown in FIG. 24, the process cartridge B has the development unit contact 16*b* for supplying power to the developing roller 16 from the printer body A, and a developing blade contact 18*a* that supplies power to the developing blade 18, at one end opposite from the development unit coupling 155 in the longitudinal direction.

As shown in FIG. 25 and FIG. 27, the replenishment port 21*c* of the process cartridge B is oriented in the longitudinal direction. As shown in FIG. 25, the replenishment port 21*c* is disposed closer to the development unit coupling 155 than to the development unit contact 16*b*, and the toner is transported in a direction away from the development unit coupling 155 into the development unit 15.

Thus the toner is transported in a direction away from the development unit coupling 155, and toner contamination of the development unit coupling 155 is less likely. The replenishment port 21*c* is distanced from the development unit contact 16*b*, and toner contamination of the development unit contact 16*b* is less likely.

The area around the inlet 153*a* of the toner receptacle 153 and the area around the delivery port 21*d* of the stay 21 are formed along a circular arc R4 about the pivot axis 8 mentioned above of the development unit 15 as shown in FIG. 16A.

The replenishment port 21*c* from which toner is received from the toner cartridge C is provided to the stay 21 and therefore stays in the same position when the development unit 15 is moved to the separated position as shown in FIG. 16B. The amount of compression the inlet seal member 153*c* undergoes hardly changes, so that a good seal is provided consistently whether the development unit 15 is separated or in contact. The inlet 153*a* is sized so that part of the inlet 153*a* is in communication with the delivery port 21*d* when the development unit is at the separated position. Thus toner can be received whether the development unit 15 is separated or in contact.

The inlet 153*a* may be completely in communication with the delivery port 21*d* as illustrated in this embodiment, or may be in communication at least partly with the delivery port.

Configuration of Toner Receptacle in Development Unit

Figure 17:
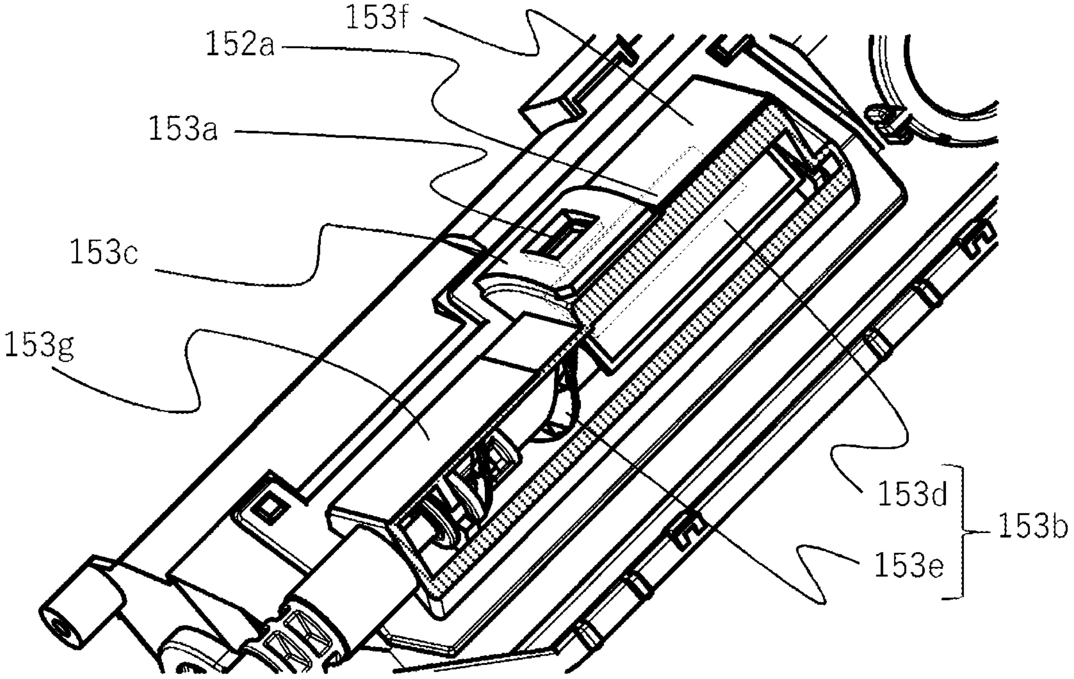
FIG. 17 is a schematic perspective view illustrating the toner receptacle of the process cartridge.

The toner receptacle 153 of the development unit 15 is described with reference to FIG. 17. FIG. 17 is a schematic perspective view of the toner receptacle 153 of the process cartridge B.

The toner cartridge C replenishes the process cartridge B with toner using the pump 37*a* as described above. Namely, the process cartridge B is replenished with a mixture of toner and air. Depending on the condition at the time of replenishment, the air may cause a rise in internal pressure of the container or may spew out and release the toner to the outside. Considering the necessity for dealing with these possibilities, the inventors developed an improved process cartridge configuration in which filters are disposed to allow a sufficient air flow during replenishment of toner that contains air.

Specifically, as shown in FIG. 17, the toner receptacle 153 includes a downstream filter 153*f* (first filter) and an upstream filter 153*g* (second filter) to allow removal of the air. In this embodiment, the downstream filter 153*f* and upstream filter 153*g* are provided to openings (respectively to a first opening 159*f* and a second opening 159*g* shown in FIG. 18) of the toner receptacle 153. As long as these filters are configured to restrict passage of the toner while allowing passage of the air, any material may be used, and the filters may be of any size and disposed anywhere and have any number of pores.

Figure 1:
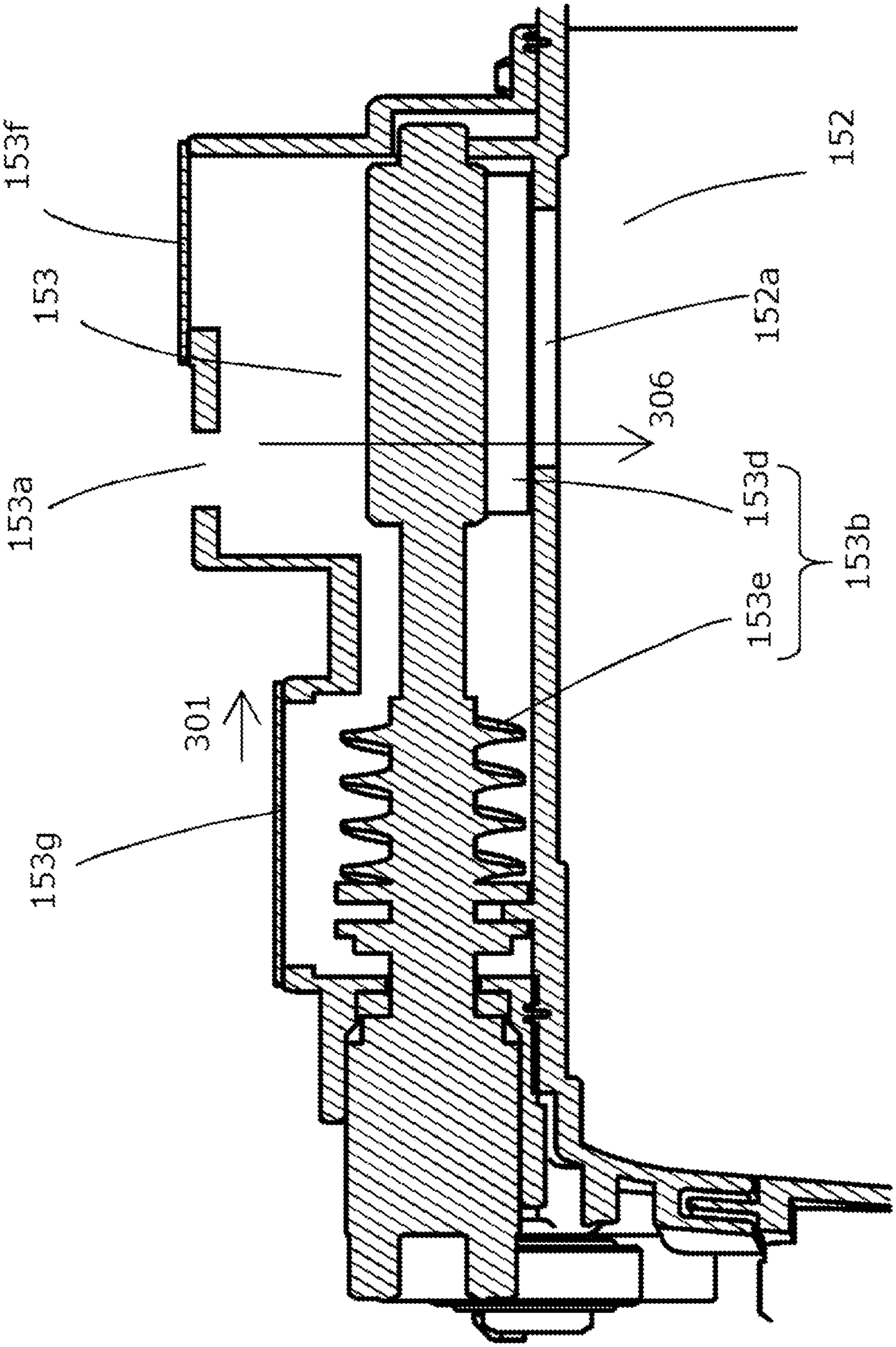
FIG. 1 is a cross-sectional view of a toner receptacle of a process cartridge.
Figure 18:
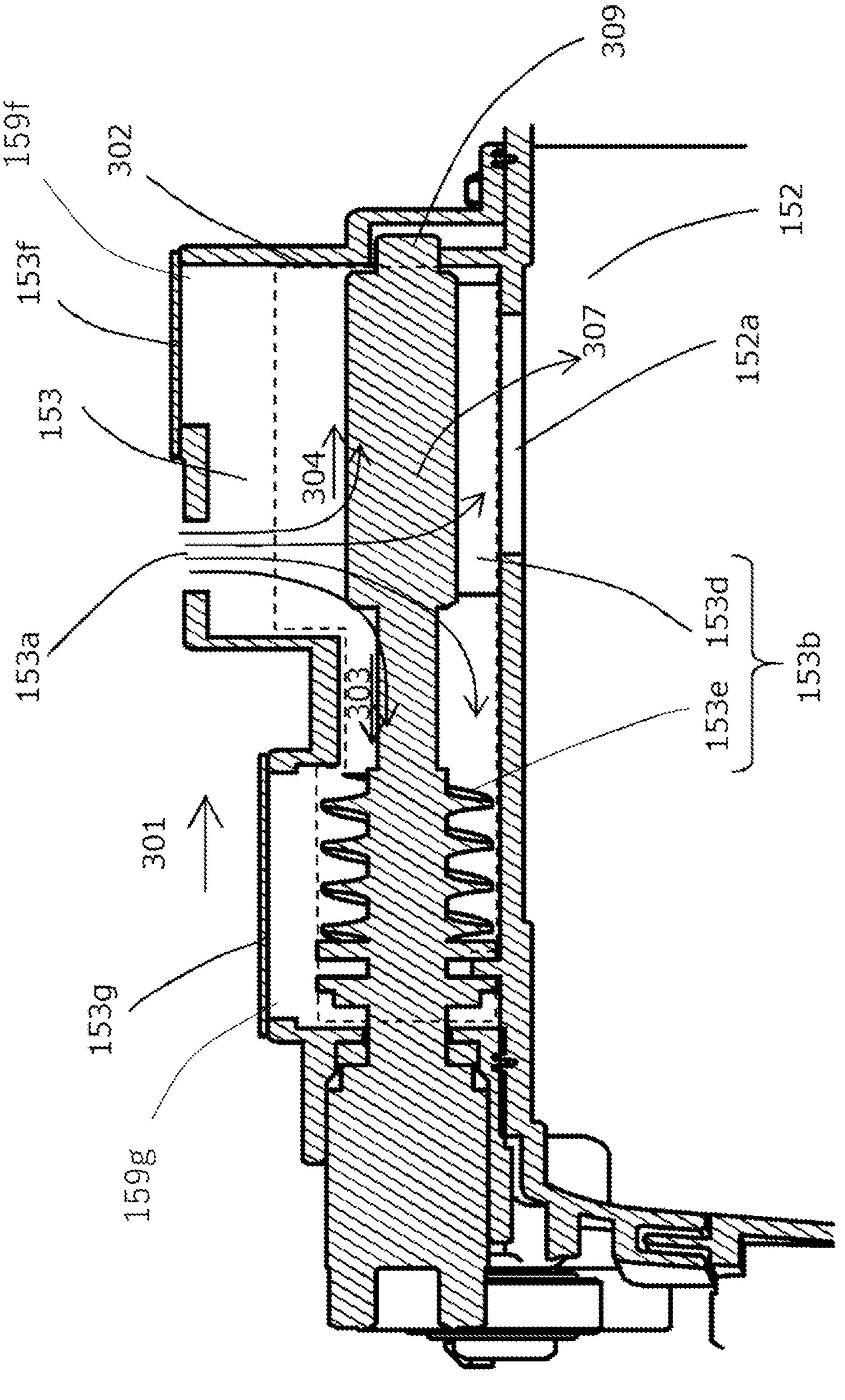
FIG. 18 is a cross-sectional view illustrating a condition of toner being transported inside the toner receptacle of the process cartridge.

Next, how the toner replenished to the toner receptacle 153 is transported is described with reference to FIG. 1 and FIG. 18. FIG. 1 is a cross-sectional view illustrating the toner receptacle 153. FIG. 18 is a cross-sectional view illustrating flows of toner in the toner receptacle 153. Inside the toner receptacle 153 is the toner transport member 153*b*, which transports the replenished toner to the developer container inlet 152*a*. Preferably, as shown in the drawing, the inlet 153*a* overlaps the developer container inlet 152*a* as viewed from above in the direction of gravity for smooth reception of toner. The toner transport member 153*b* is provided with a sheet member 153*d* and a helical screw part 153*e*. The toner transport member 153*b* with a rotating shaft 309 at its center rotates, so that the helical screw part 153*e* transports the toner that has fallen from the inlet 153*a* and deposited inside the toner receptacle 153 in the transport direction 301. The sheet member 153*d* replenishes toner to the developer container 152 through the developer container inlet 152*a*.

As shown in FIG. 18, the cavity 302 is provided below the inlet 153*a* as the transport region on both upstream and downstream of the inlet 153*a* in the transport direction 301 for toner replenishment. This allows the toner brought in from the inlet 153*a* to be dispersed to the upstream side 303 and downstream side 304 of the inlet 153*a* in the transport direction, so that toner clogging around the inlet 153*a* can be prevented.

Figure 19:
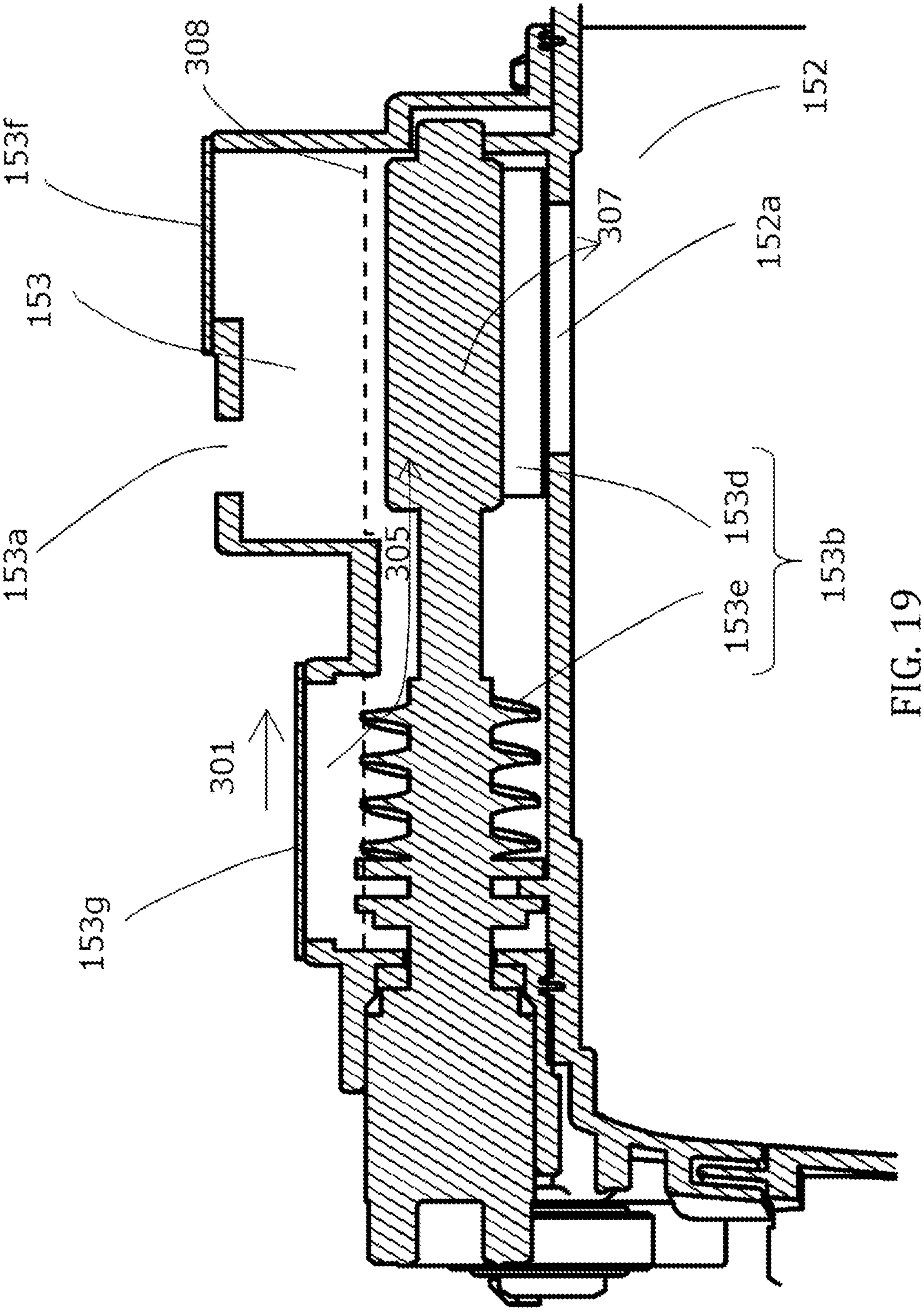
FIG. 19 is a cross-sectional view illustrating a condition of toner powder level inside the toner receptacle of the process cartridge.

Next, the positions of the at least two filters provided to the toner receptacle 153 are explained with reference to FIG. 19. FIG. 19 is a cross-sectional view illustrating a condition of toner powder level 308 inside the toner receptacle 153.

The downstream filter 153*f*, or a first air filter, is provided downstream in the transport direction 301 of the toner transport member 153*b* and above the sheet member 153*d*. The upstream filter 153*g*, or a second air filter, is provided upstream in the transport direction 301. The downstream filter 153*f* and upstream filter 153*g* are both disposed higher than the helical screw part 153*e* in the direction of gravity.

The toner replenished from the inlet 153*a* is transported by the helical screw part 153*e* and the sheet member 153*d* toward the developer container inlet 152*a* (arrow 305). Namely, the toner is replenished constantly from the developer container inlet 152*a* into the developer container 152 so that the toner powder level does not rise above the sheet member 153*d* and reach the downstream filter 153*f*. As a result, air is present below the downstream filter 153*f*, and the air supplied with toner from the inlet 153*a* can be constantly released through the downstream filter 153*f*.

Providing the upstream filter 153*g* and downstream filter 153*f* allows a larger filter area to be secured around the inlet 153*a* of the toner receptacle 153. This enables stable discharge and intake of air through the inlet 153*a*. As a result, the toner is supplied in a stable manner.

In FIG. 19, the downstream filter 153*f* is partly positioned higher than the upstream filter 153*g* in the direction of gravity. It is preferable to provide the downstream filter 153*f* such as to be at least partly positioned higher than the upstream filter 153*g* in the direction of gravity in this manner. This way, air can be present more readily below the downstream filter 153*f* even when the powder level inside the toner receptacle 153 is high, i.e., the condition for favorable air flow can be maintained. Air taken in from the inlet 153*a* enters through the upstream filter 153*g* so that the air flows in the direction of arrow 307 and can transport the toner inside the toner receptacle 153 toward the developer container inlet 152*a*.

Moreover, it is preferable to dispose at least part of the downstream filter 153*f* higher than the inlet 153*a* in the direction of gravity. This prevents the toner replenished to the inlet 153*a* from clogging the downstream filter 153*f* so that air can be removed reliably from the mixture of toner and air.

Next, how the developer container inlet 152*a* and the downstream filter 153*f* are positioned along the transport direction is explained. As shown in FIG. 19, the downstream filter 153*f* is partly positioned further downstream of the developer container inlet 152*a* in the transport direction. The toner replenished from the inlet 153*a* is transported to the developer container inlet 152*a* by air flow. The air can then exit downstream of the developer container inlet 152*a* in the transport direction. Thus the toner can be transported to the developer container in a stable manner.

Referring now to FIG. 1, the inlet 153*a* partly overlaps the developer container inlet 152*a* in the transport direction 301. The toner replenished from the inlet 153*a* into the toner receptacle 153 can travel vertically downward 306 by gravity, and can be replenished into the developer container 152 through the developer container inlet 152*a*. The developer container inlet 152*a* has a larger area than the inlet 153*a*. The developer container inlet 152*a* is therefore capable of replenishing more toner into the developer container 152 than the amount of toner replenished from the inlet 153*a*, so that toner clogging can be prevented.

As demonstrated in this embodiment, with the configurations described above combined together, the air flow around the inlet 153*a* and the developer container inlet 152*a* can be stabilized, which prevents toner clogging and ensures stable replenishment of toner toward the developer container 152.

Embodiment 2

Embodiment 2 of the present invention is described next. This embodiment gives a detailed account of the features that are different from the previously described embodiment. The materials and shapes should be regarded as the same as those of the previously described embodiment unless specifically mentioned otherwise. The same features are assigned the same reference numerals and no detailed account thereof will be given.

Figure 20:
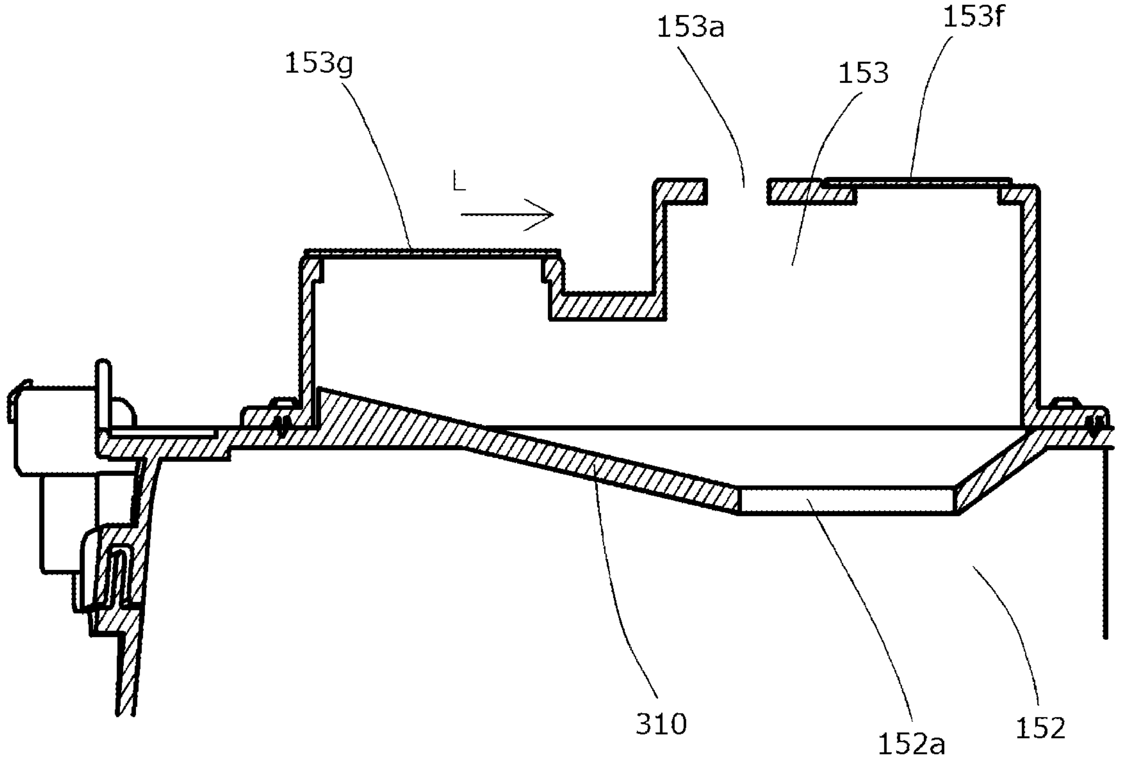
FIG. 20 is a cross-sectional view illustrating the toner receptacle of the process cartridge in a second embodiment.

This embodiment illustrates a configuration in which the toner receptacle 153 has a sloped bottom surface. The toner receptacle 153 of the development unit 15 is described with reference to FIG. 20. FIG. 20 is a cross-sectional view illustrating the toner receptacle of Embodiment 2.

The toner cartridge C replenishes the process cartridge B with toner using the pump 37*a* (FIG. 14A and FIG. 14B) as described above. Namely, the process cartridge B is replenished with a mixture of toner and air. The toner receptacle 153 that has the inlet 153*a* is provided with the developer container inlet 152*a* offset from the inlet 153*a* to one side in direction L perpendicular to the direction of gravity. The bottom surface of the toner receptacle 153 is a slope 310 inclined downwardly from the inlet 153*a* toward the developer container inlet 152*a* in the direction L perpendicular to the direction of gravity. Namely, the transport means used in the transport region of this embodiment is the sloped bottom surface, and the orientation of the slope determines the transport direction. Therefore, in addition to the pump 37*a* that delivers the toner from the developer container inlet 152*a* into the developer container 152, the inclination of the slope 310 allows the toner to travel toward the developer container inlet 152*a*. Moreover, vibration generated as the development unit 15 makes contact and separates helps transport the toner replenished from the inlet 153*a* more toward the developer container inlet 152*a*.

Accordingly, with the slope 310 on the bottom surface of the toner receptacle 153, there is no need to provide a transport member, and yet the toner inside the toner receptacle 153 can be transported into the developer container 152 of the process cartridge B.

As described above, Embodiment 2 enables efficient transport of toner inside the toner receptacle 153 into the process cartridge B without a transport member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102165, filed on Jun. 24, 2022, which is hereby incorporated by reference wherein in its entirety.

What is claimed is:

1. A process cartridge comprising:

a receptacle provided with a replenishment port from which developer is replenished, the receptacle being configured to receive the developer replenished from the replenishment port; and a transport member disposed lower than the replenishment port in a direction of gravity in the receptacle and configured to transport the developer in a transport direction, wherein the receptacle is provided with a first filter disposed on a first opening located downstream of the replenishment port in the transport direction, and a second filter disposed on a second opening located upstream of the replenishment port in the transport direction, the first filter and the second filter are configured to restrict passage of the developer while allowing passage of air, and wherein the first filter and the second filter are located higher than the transport member in the direction of gravity, and the first filter is located higher than the second filter in the direction of gravity.

2. The process cartridge according to claim 1, further comprising:

a container configured to contain the developer; and a container inlet configured to allow the developer to travel from the receptacle to the container.

3. The process cartridge according to claim 2, wherein the replenishment port is at least partly located upstream of the container inlet in the transport direction, and he first filter is at least partly located downstream of the container inlet in the transport direction.

4. The process cartridge according to claim 1, wherein the first filter is at least partly located higher than the replenishment port in the direction of gravity.

5. The process cartridge according to claim 2, further comprising a developer cartridge connected to the replenishment port and configured to replenish the developer to the receptacle by discharging the developer by using a pump, wherein the container inlet is at least partly located downstream of the replenishment port in the transport direction, and wherein the first filter is located downstream of the replenishment port in the transport direction.

6. The process cartridge according to claim 2, wherein the replenishment port is located upstream of the container inlet in the transport direction.

7. The process cartridge according to claim 2, wherein the replenishment port overlaps part of the container inlet when viewed from above in the direction of gravity.

8. A process cartridge comprising:

a receptacle provided with a replenishment port from which developer is replenished, the receptacle being configured to receive the developer replenished from the replenishment port;

a container configured to contain the developer; and a container inlet configured to allow the developer to travel from the receptacle to the container, wherein the container inlet is provided in a bottom surface of the receptacle, wherein the bottom surface has a slope, wherein the receptacle is provided with:

a first filter disposed on a first opening located downstream of the replenishment port, the downstream being a lower side in a direction of gravity of the slope; and a second filter disposed on a second opening located upstream of the replenishment port, the upstream being an upper side in the direction of gravity of the slope, and the first filter and the second filter being configured to restrict passage of the developer while allowing passage of air, and wherein the first filter or the second filter being is located higher than the receptacle in the direction of gravity.

9. The process cartridge according to claim 8, wherein the bottom surface is inclined toward the container inlet.

10. A process cartridge comprising:

a receptacle provided with a replenishment port from which developer is replenished, the receptacle being configured to receive the developer replenished from the replenishment port;

a transport member disposed lower than the replenishment port in a direction of gravity in the receptacle and configured to transport the developer in a transport direction;

a container configured to contain the developer; and a container inlet configured to allow the developer to travel from the receptacle to the container, wherein the receptacle is provided with a first filter disposed on a first opening located downstream of the replenishment port in the transport direction, and a second filter disposed on a second opening located upstream of the replenishment port in the transport direction, the first filter and the second filter being configured to restrict passage of the developer while allowing passage of air, wherein the first filter and the second filter are located higher than the transport member in the direction of gravity, wherein the replenishment port overlaps part of the container inlet when viewed from above in the direction of gravity.

* * * * *